US012028130B2

(12) United States Patent
Imanilov et al.

(10) Patent No.: US 12,028,130 B2
(45) Date of Patent: Jul. 2, 2024

(54) MULTI-BEAM UNIFORM COVERAGE IN A COVERAGE CELL(S) IN A WIRELESS COMMUNICATIONS SYSTEM (WCS)

(71) Applicant: Corning Research & Development Corporation, Corning, NY (US)

(72) Inventors: Benjamin Imanilov, Hod haSharon (IL); Viacheslav Viacheslavovich Ivanov, St. Petersburg (RU); Andrey Kobyakov, Painted Post, NY (US); Shirish Nagaraj, Pleasanton, CA (US); Deepak Pengoria, Milpitas, CA (US); Evgenii Pustovalov, Saint-Petersburg (RU); Hsien Li Woo, San Diego, CA (US)

(73) Assignee: Corning Research & Development Corporation, Corning, NY (US)

( * ) Notice: Subject to any disclaimer, the term of this patent is extended or adjusted under 35 U.S.C. 154(b) by 129 days.

(21) Appl. No.: 17/828,171

(22) Filed: May 31, 2022

(65) Prior Publication Data
US 2023/0387970 A1 Nov. 30, 2023

(51) Int. Cl.
*H04B 7/0426* (2017.01)
*H04B 7/0408* (2017.01)
(Continued)

(52) U.S. Cl.
CPC ......... *H04B 7/0426* (2013.01); *H04B 7/0408* (2013.01); *H04B 7/0617* (2013.01); *H04B 7/0695* (2013.01); *H04W 72/046* (2013.01)

(58) Field of Classification Search
CPC . H04B 7/02; H04B 7/022; H04B 7/04; H04B 7/04026; H04B 7/0408;
(Continued)

(56) References Cited

U.S. PATENT DOCUMENTS 8,462,716 B1* 6/2013 Li ..................... H04B 7/065
370/465
2019/0245608 A1* 8/2019 Kakishima ............ H04W 88/02
(Continued)

FOREIGN PATENT DOCUMENTS

CN 114631231 A * 6/2022 ............. H01Q 21/24

*Primary Examiner* — Young T. Tse
(74) *Attorney, Agent, or Firm* — William D. Doyle

(57) ABSTRACT

Multi-beam uniform coverage in a coverage cell(s) in a wireless communications system (WCS) is provided. The WCS includes a number of wireless devices that are typically mounted on a fixed structure to provide coverage for user devices. Each wireless device includes one or more antenna arrays. Each antenna array is controlled via a set of codewords to form one or more RF beams to each cover a respective area in a coverage cell. The codewords are predetermined based on fairness and/or leakage constraints such that the RF beams can be formed in desired geometric shapes and steered toward desired directions to provide a uniform coverage in the coverage cell. By forming the RF beams based on the codewords predetermined based on fairness and/or leakage constraints, it is possible to ensure an equal RF power signal level inside the coverage cell and/or reduced power leakage outside the coverage cell.

24 Claims, 17 Drawing Sheets

(51) Int. Cl.
*H04B 7/06* (2006.01)
*H04W 72/044* (2023.01)

(58) Field of Classification Search
CPC .. H04B 7/0426; H04B 7/0456; H04B 7/0495; H04B 7/0617; H04B 7/0695; H04W 72/046
USPC ............... 375/260, 267; 370/334, 335, 342; 455/443, 444
See application file for complete search history.

(56) References Cited

U.S. PATENT DOCUMENTS

| | | | |
|---|---|---|---|
| 2021/0058131 A1* | 2/2021 | Zhu | H04B 7/063 |
| 2022/0149907 A1 | 5/2022 | Göransson | |
| 2022/0155439 A1 | 5/2022 | Rindal et al. | |
| 2022/0159480 A1 | 5/2022 | Lu et al. | |
| 2022/0166487 A1* | 5/2022 | Kundalkar | H04B 7/088 |
| 2022/0173783 A1 | 6/2022 | Dash et al. | |
| 2022/0191855 A1 | 6/2022 | Akkarakaran et al. | |
| 2022/0201389 A1 | 6/2022 | Hassani et al. | |
| 2022/0201675 A1 | 6/2022 | Akkarakaran et al. | |
| 2022/0385367 A1* | 12/2022 | Mizrahi | H04W 4/026 |

\* cited by examiner

MULTI-BEAM UNIFORM COVERAGE IN A COVERAGE CELL(S) IN A WIRELESS COMMUNICATIONS SYSTEM (WCS)

BACKGROUND

The disclosure relates generally to enabling multi-cell multi-beam uniform coverage in a wireless communications system (WCS), which can include a Fifth Generation (5G) system, a 5G New Radio (5G-NR) system, and/or a distributed communications system (DCS).

Wireless communication is rapidly growing, with ever-increasing demands for high-speed mobile data communication. As an example, local area wireless services and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming RF antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from a few meters to a few miles, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a WCS 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station (e.g., eNodeB or gNodeB) that includes modem functionality and is configured to distribute communications signal streams 108(1)-108(S) to the wireless client devices 106(1)-106(W) based on communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112 (e.g., a single antenna or an antenna array). As another example, the radio node 102 in the WCS 100 in FIG. 1 can be a small cell radio access node ("small cell") that is configured to support the multiple service providers 104(1)-104(N) by distributing the communications signal streams 108(1)-108(S) for the multiple service providers 104(1)-104(N) based on respective communications signals 110(1)-110(N) received from a respective core network $CN_1$-$CN_N$ of the service providers 104(1)-104(N) through interface connections. The radio node 102 includes radio circuits 118(1)-118(N) for each service provider 104(1)-104(N) that are configured to create multiple simultaneous or non-simultaneous RF beams ("beams") 120(1)-120(N) for the communications signal streams 108(1)-108(S) to serve multiple wireless client devices 106(1)-106(W). For example, the multiple RF beams 120(1)-120(N) may support beam based and/or massive multiple-input, multiple-output (mMIMO) communications.

The radio node 102 of the WCS 100 in FIG. 1 may be configured to support service providers 104(1)-104(N) that have a different frequency channel and do not share the spectrum. Thus, in this instance, the communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have a shared spectrum. In this regard, the capacity supported by the radio node 102 for the shared spectrum is split (i.e., shared) between the multiple service providers 104(1)-104(N) for providing services to the subscribers.

The radio node 102 in FIG. 1 can also be coupled to a distributed communications system (DCS), such as a distributed antenna system (DAS), such that the radio circuits 118(1)-118(N) remotely distribute the communications signals 110(1)-110(N) of the multiple service providers 104(1)-104(N) to remote units. The remote units can each include an antenna array that includes tens or even hundreds of antennas for concurrently radiating the communications signals 110(1)-110(N) to sub scribers using spatial multiplexing. Herein, the spatial multiplexing is a scheme that takes advantage of the differences in RF channels between transmitting and receiving antennas or antenna pairs to provide multiple independent streams between the transmitting and receiving antennas, thus increasing throughput by sending data over parallel streams. Accordingly, the remote units can be said to radiate the communications signals 110(1)-110(N) to subscribers based on a massive multiple-input multiple-output (M-MIMO) scheme.

The WCS 100 may be configured to operate as a Fifth Generation (5G) or a 5G New Radio (5G-NR) communications system. In this regard, the radio node 102 can function as a 5G or 5G-NR base station (a.k.a. gNB) to service the wireless client devices 106(1)-106(W). Notably, the 5G or 5G-NR wireless communications system may be implemented based on a spectrum that can make the communications signals 110(1)-110(N) more susceptible to propagation loss and/or interference. As such, it is desirable to form the RF beams 120(1)-120(N) in a desirable RF beam pattern and/or steer the RF beams 120(1)-120(N) in a desirable direction to concentrate radiated energy in a direction of a desired sub-area to thereby help mitigate signal propagation loss and/or interference in the desired sub-area.

The antenna 112 will be provided as an antenna array 112 that includes multiple antenna elements. These antenna elements may be arranged into a planar M×N array with M rows and N columns (M and N are positive integers). Each of the antenna elements can be controlled by a respective complex coefficient consisting of a real amplitude part and an imaginary phase part. For example, a data stream radiated via each of the RF beams 120(1)-120(N), the data stream is replicated into M×N copies, each multiplied by the respective complex coefficient to have a respective constant amplitude and a respective constant phase to thereby cause each of the RF beams 120(1)-120(N) to be formed in a specific shape and steered toward a specific direction. In this regard, it would require multiple sets of the complex coefficients (a.k.a. multiple codewords) for forming each of the RF beams 120(1)-120(N) in respective shapes and directions. These multiple codewords are commonly referred to as a codebook. Notably, the codebook can be predetermined and stored in the radio node 102, whereby the radio node 102 can retrieve the codewords dynamically to form the RF beams 120(1)-120(N).

SUMMARY

Embodiments disclosed herein include multi-beam uniform coverage in a coverage cell(s) in a wireless communications system (WCS). The WCS includes a number of wireless devices, such as remote units and/or base stations, that are typically mounted on a fixed structure (e.g., ceiling, wall, lamp post, etc.) to provide coverage for user devices. Each wireless device can include one or more antenna arrays. Each antenna array can be controlled via a set of codewords to form one or more RF beams (e.g., initial access and other broadcasted beams) to each cover a respective area in a coverage cell. In embodiments disclosed herein, the set of codewords is predetermined based on fairness and/or leakage constraints such that the RF beams can be formed in desired geometric shapes and steered toward desired directions to provide a uniform coverage in the coverage cell. By forming the RF beams based on the codewords predetermined based on fairness and/or leakage constraints, it is possible to ensure an equal RF power signal level inside the coverage cell and/or reduced power leakage outside the coverage cell, thus making it possible to enable a multi-cell coverage in the WCS.

One exemplary embodiment of the disclosure relates to a wireless device. The wireless device includes one or more antenna arrays. Each of the one or more antenna arrays is configured to form a main radio frequency (RF) beam to provide a uniform coverage in a main coverage area of a first geometric shape in a respective one of one or more coverage cells. The wireless device also includes a control circuit. The control circuit is configured to select one or more main beam codewords predetermined for forming the main RF beam in the one or more coverage cells, respectively. The control circuit is also configured to cause the one or more antenna arrays to each form the main RF beam to provide the uniform coverage in the respective one of the one or more coverage cells based on a respective one of the one or more selected main beam codewords.

An additional exemplary embodiment of the disclosure relates to a method for providing multi-beam uniform coverage. The method includes selecting one or more main beam codewords each predetermined for forming a main RF beam to provide a uniform coverage in a main coverage area of a first geometric shape in a respective one of one or more coverage cells. The method also includes forming the main RF beam in each of the one or more coverage cells based on a respective one of the one or more selected main beam codewords.

An additional exemplary embodiment of the disclosure relates to a WCS. The WCS includes at least one wireless device. The at least one wireless device includes one or more antenna arrays. Each of the one or more antenna arrays is configured to form a main RF beam to provide a uniform coverage in a main coverage area of a first geometric shape in a respective one of one or more coverage cells. The at least one wireless device also includes a control circuit. The control circuit is configured to select one or more main beam codewords predetermined for forming the main RF beam in the one or more coverage cells, respectively. The control circuit is also configured to cause the one or more antenna arrays to each form the main RF beam to provide the uniform coverage in the respective one of the one or more coverage cells based on a respective one of the one or more selected main beam codewords.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include multi-beam uniform coverage in a coverage cell(s) in a wireless communications system (WCS). The WCS includes a number of wireless devices, such as remote units and/or base stations, that are typically mounted on a fixed structure (e.g., ceiling, wall, lamp post, etc.) to provide coverage for user devices. Each wireless device can include one or more antenna arrays. Each antenna array can be controlled via a set of codewords to form one or more RF beams (e.g., initial access and other broadcasted beams) to each cover a respective area in a coverage cell. In embodiments disclosed herein, the set of codewords is predetermined based on fairness and/or leakage constraints such that the RF beams can be formed in desired geometric shapes and steered toward desired directions to provide a uniform coverage in the coverage cell. By forming the RF beams based on the codewords predetermined based on fairness and/or leakage constraints, it is possible to ensure an equal RF power signal level inside the coverage cell and/or reduced power leakage outside the coverage cell, thus making it possible to enable a multi-cell coverage in the WCS.

Figure 1:
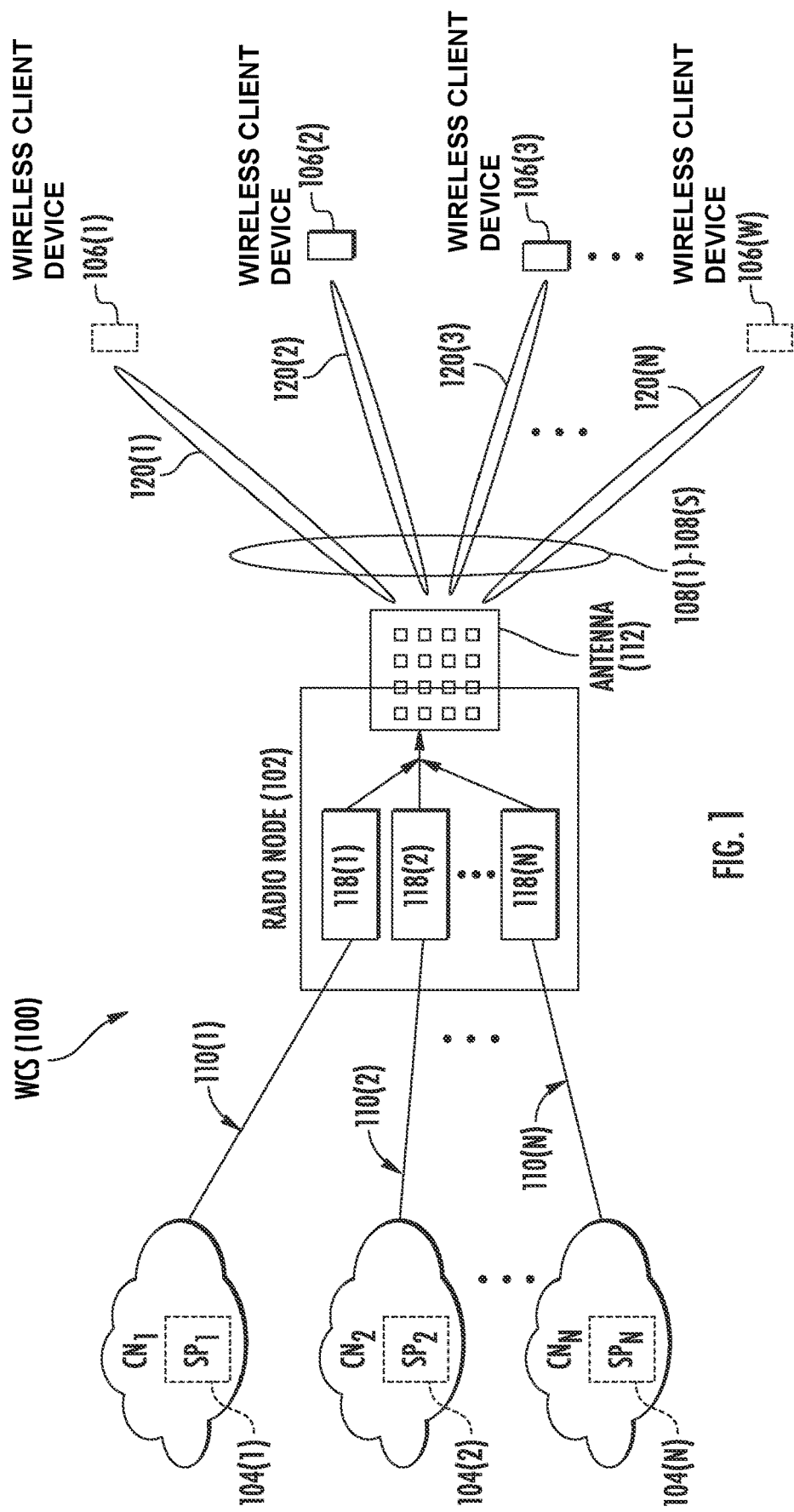
FIG. 1 is a schematic diagram of an exemplary communications system (CS), such as a distributed communications system (DCS), configured to distribute communications services to remote coverage areas.
Figure 2:
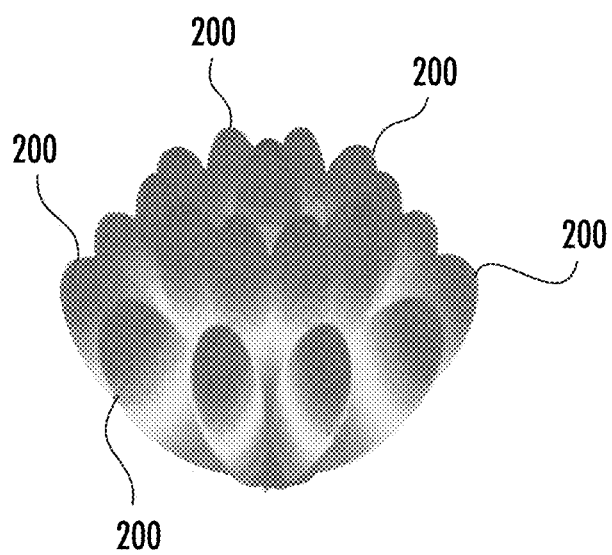
FIG. 2 provides an exemplary illustration of a number of fundamental aspects related to radio frequency (RF) beamforming.
Figure 3:
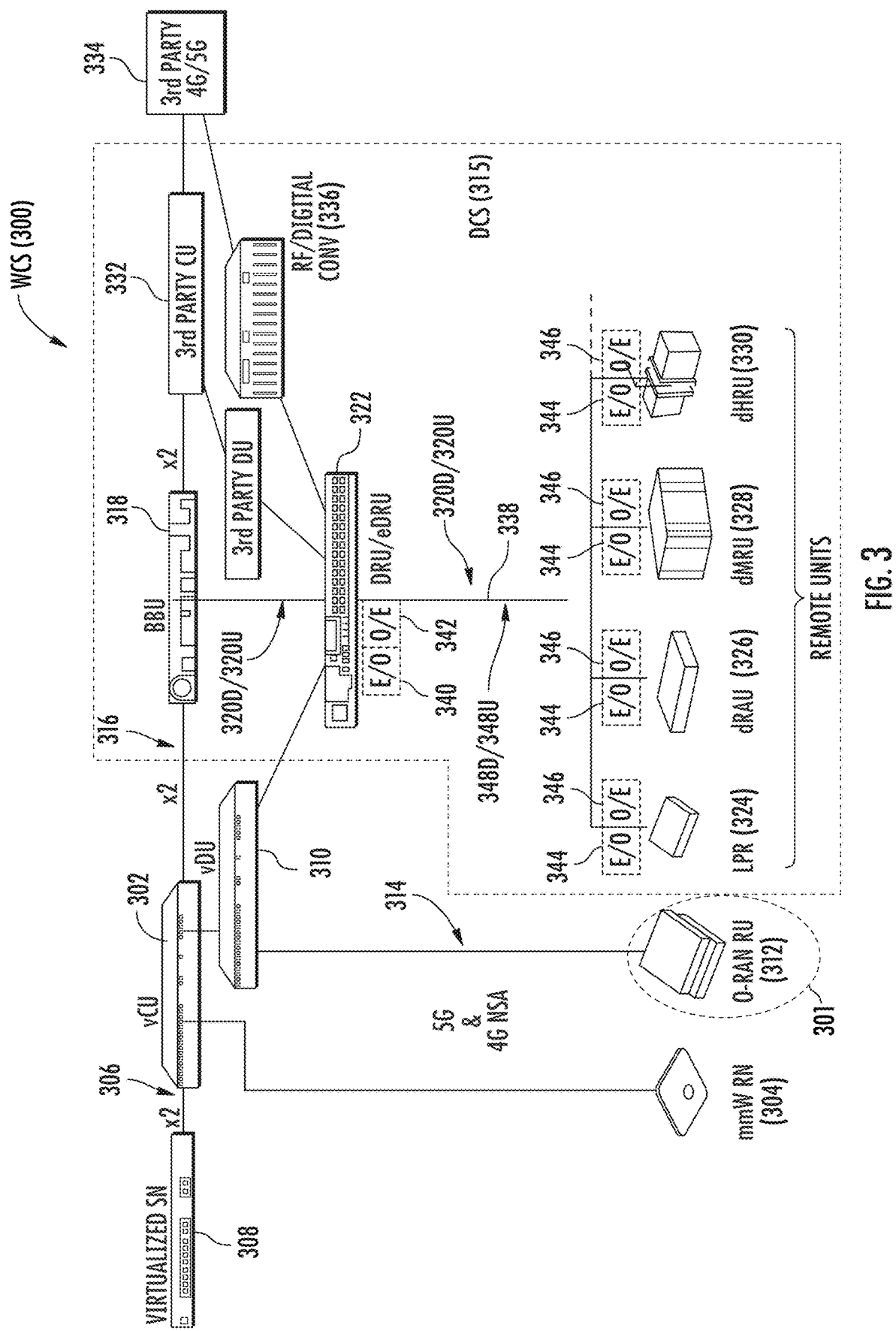
FIG. 3 is a schematic diagram of an exemplary wireless communications system (WCS) that can be configured according to any of the embodiments disclosed herein to provide multi-beam uniform coverage in a coverage cell(s)

Before discussing a wireless device of the present disclosure configured to provide multi-beam uniform coverage in a coverage cell, starting at FIG. 3, a brief overview is first provided with reference to FIG. 2 to help explain some fundamental aspects related to RF beamforming.

FIG. 2 provides an exemplary illustration of a number of fundamental aspects related to RF beamforming. In general, beamforming refers to a technique that uses multiple antennas to simultaneously radiate an RF signal in an RF spectrum, such as a millimeter wave (mmWave) spectrum. The multiple antennas, also called "antenna elements," are typically organized into an antenna array (e.g., 4×4, 8×8, 16×16, etc.) and separated from each other by a separation distance such as a one-half (½) wavelength.

In a 5G or 5G-NR system, a user equipment (UE) must detect a reference beam (a.k.a. initial access beam) when entering a coverage cell to thereby obtain critical information (e.g., synchronization information) provided by a gNB before the UE can establish a connection with the gNB. As such, the gNB may radiate multiple RF beams 200 as reference beams, which includes initial access and synchronization signals, in the coverage cell periodically. In this regard, an overall coverage of the RF beams 200 defines the coverage cell of the gNB. Specifically, the gNB may be configured to periodically radiate the RF beams 200 in different directions such that the UE can quickly detect one or more of the reference beams 200 at any location in the coverage cell. In this regard, how quickly and easily the UE can detect the reference beams 200 in the coverage cell can serve as an indicator of a coverage level of the coverage cell. Accordingly, the gNB is said to provide a highest level of coverage in the coverage cell if the UE can detect the reference beams 200 at any location in the coverage cell.

Understandably, the more focused (e.g., narrower) the gNB radiates the reference beams 200, the higher energy can be directed toward a particular direction in the coverage cell. As a result, a higher number of the reference beams 200 would be needed to provide adequate coverage in the coverage cell. However, an actual number of the reference beams 200 that can be radiated in the coverage cell is limited by a standard-defined parameter known as the synchronization signal block (SSB). In addition, the gNB would incur higher computational complexity and latency to increase the number of the reference beams 200.

The UE in the coverage cell can sweep through the reference beams 200 to identify a candidate reference beam(s) associated with a strongest reference signal received power (RSRP). Further, the UE may decode a candidate SSB(s) associated with the identified candidate reference beam(s) to acquire such information as physical cell identification (PCI) and a PBCH demodulation reference signal (DMRS). Based on the candidate reference beam(s) reported by the UE, the gNB may pinpoint a location of the UE and steer a data-bearing RF beam toward the UE to enable data communication with the UE.

In a typical outdoor 5G or 5G-NR system, the eNB needs to serve a larger outdoor coverage cell (e.g., a number of city blocks, an entire community, etc.). Given that different UEs in the outdoor coverage cell may be located farther apart from one another, the focus for the eNB is to make sure a UE located at an edge of the outdoor coverage cell can have a sufficient receiving power level. Accordingly, the eNB needs to radiate the RF beams 200 with higher beamformed antenna gain to reach the UE located at the edge of the outdoor coverage cell. Further, since the RF beams 200 are formed with narrower beamwidth, the eNB 200 also needs to form as many RF beams 200 as possible to cover different locations in the outdoor coverage cell. In the outdoor coverage cell, energy distribution is non-uniform, meaning that a UE located closer to the eNB will see a much higher energy level than a UE located at the edge of the outdoor coverage cell.

In contrast, in a typical indoor 5G or 5G-NR system such as WCS, the eNB may be mounted on a fixed indoor structure (e.g., ceiling, wall, lamp post, etc.) to serve a smaller indoor coverage cell (e.g., a room, a hallway, etc.). As such, the eNB can radiate the RF beams 200 with lower beamformed antenna gain in a radiation direction. Further, since the RF beams 200 are formed with wider beamwidth, the eNB 200 can form as fewer as a single main RF beam to cover different locations in the indoor coverage cell. In the indoor coverage cell, energy distribution is uniform, meaning that all UEs will have a uniform receiving power level in the indoor coverage cell.

In this regard, FIG. 3 is a schematic diagram of an exemplary WCS 300 that can be configured according to any of the embodiments disclosed herein to provide uniform coverage in a coverage cell(s) 301. The WCS 300 supports both legacy 4G LTE, 4G/5G non-standalone (NSA), and 5G standalone communications systems. As shown in FIG. 3, a centralized services node 302 is provided that is configured to interface with a core network to exchange communications data and distribute the communications data as radio signals to remote units. In this example, the centralized services node 302 is configured to support distributed communications services to an mmWave radio node 304. Despite that only one of the mmWave radio node 304 is shown in FIG. 3, it should be appreciated that the WCS 300 can be configured to include additional numbers of the mmWave radio node 304, as needed. The functions of the centralized services node 302 can be virtualized through an x2 interface 306 to another services node 308. The centralized services node 302 can also include one or more internal radio nodes that are configured to be interfaced with a distribution unit (DU) 310 to distribute communications signals to one or more open radio access network (O-RAN) remote units (RUs) 312 that are configured to be communicatively coupled through an O-RAN interface 314. The O-RAN RUs 312 are each configured to communicate downlink and uplink communications signals in the coverage cell(s) 301.

The centralized services node 302 can also be interfaced with a distributed communications system (DCS) 315 through an x2 interface 316. Specifically, the centralized services node 302 can be interfaced with a digital baseband unit (BBU) 318 that can provide a digital signal source to the centralized services node 302. The digital BBU 318 may be configured to provide a signal source to the centralized services node 302 to provide downlink communications signals 320D to a digital routing unit (DRU) 322 as part of a digital distributed antenna system (DAS). The DRU 322 is configured to split and distribute the downlink communications signals 320D to different types of remote units, including a low-power remote unit (LPR) 324, a radio antenna unit (dRAU) 326, a mid-power remote unit (dMRU) 328, and a high-power remote unit (dHRU) 330. The DRU 322 is also configured to combine uplink communications signals 320U received from the LPR 324, the dRAU 326, the dMRU 328, and the dHRU 330 and provide the combined uplink communications signals to the digital BBU 318. The digital BBU 318 is also configured to interface with a third-party central unit 332 and/or an analog source 334 through a radio frequency (RF)/digital converter 336.

The DRU 322 may be coupled to the LPR 324, the dRAU 326, the dMRU 328, and the dHRU 330 via an optical fiber-based communications medium 338. In this regard, the DRU 322 can include a respective electrical-to-optical (E/O) converter 340 and a respective optical-to-electrical (O/E) converter 342. Likewise, each of the LPR 324, the dRAU 326, the dMRU 328, and the dHRU 330 can include a respective E/O converter 344 and a respective O/E converter 346.

The E/O converter 340 at the DRU 322 is configured to convert the downlink communications signals 320D into downlink optical communications signals 348D for distribution to the LPR 324, the dRAU 326, the dMRU 328, and the dHRU 330 via the optical fiber-based communications medium 338. The O/E converter 346 at each of the LPR 324, the dRAU 326, the dMRU 328, and the dHRU 330 is configured to convert the downlink optical communications signals 348D back to the downlink communications signals 320D. The E/O converter 344 at each of the LPR 324, the dRAU 326, the dMRU 328, and the dHRU 330 is configured to convert the uplink communications signals 320U into uplink optical communications signals 348U. The O/E converter 342 at the DRU 322 is configured to convert the uplink optical communications signals 348U back to the uplink communications signals 320U.

Figure 4:
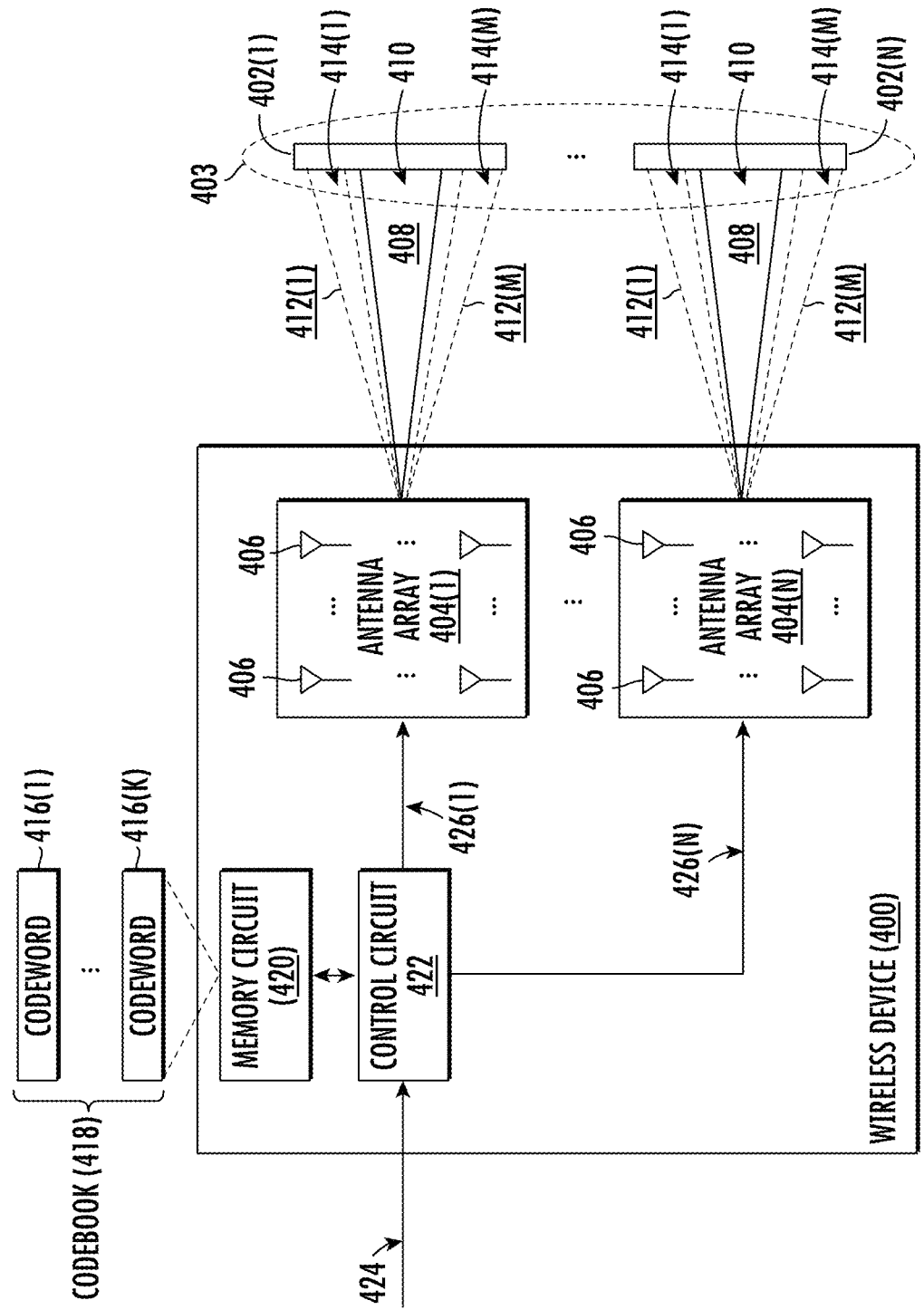
FIG. 4 is a schematic diagram of an exemplary wireless device, which can be provided in the WCS of FIG. 3 and configured according to an embodiment of the present disclosure to provide uniform coverage in one or more coverage cells of a multi-cell coverage area.

In an embodiment, the O-RAN RU 312 can be configured according to embodiments disclosed in the present disclosure to provide uniform coverage in the coverage cell(s) 301. In this regard, FIG. 4 is a schematic diagram of an exemplary wireless device 400, which can be provided as the O-RAN RU 312 in the WCS 300 of FIG. 3 and configured according to an embodiment of the present disclosure to provide uniform coverage in one or more coverage cells 402(1)-402(N) of a multi-cell coverage area 403.

The wireless device 400 includes one or more antenna arrays 404(1)-404(N). Each of the antenna arrays 404(1)-404(N) includes a plurality of antenna elements 406. In an embodiment, the antenna elements 406 are provided in M rows and N columns (M and N are positive integers) to thereby form an M×N grid. In an embodiment, the antenna elements 406 are equally spaced in the M×N grid in each of the antenna arrays 404(1)-404(N).

In an embodiment, each of the antenna arrays 404(1)-404(N) is configured to form a main RF beam 408 to provide a uniform coverage in a main coverage area 410 in a respective one of the coverage cells 402(1)-402(N). In addition, each of the antenna arrays 404(1)-404(N) may also be configured to form a plurality of side RF beams 412(1)-412(M) to each cover a respective one of a plurality of side coverage areas 414(1)-414(M) in the respective one of the coverage cells 402(1)-402(N). Specifically, the main RF beam 408 may be formed to cover the main coverage area 410 in a first geometric shape and the side RF beams 412(1)-412(M) may be formed to cover the side coverage areas 414(1)-414(M) in at least one second geometric shape, which may be identical to or different from the first geometric shape.

Figure 5A:
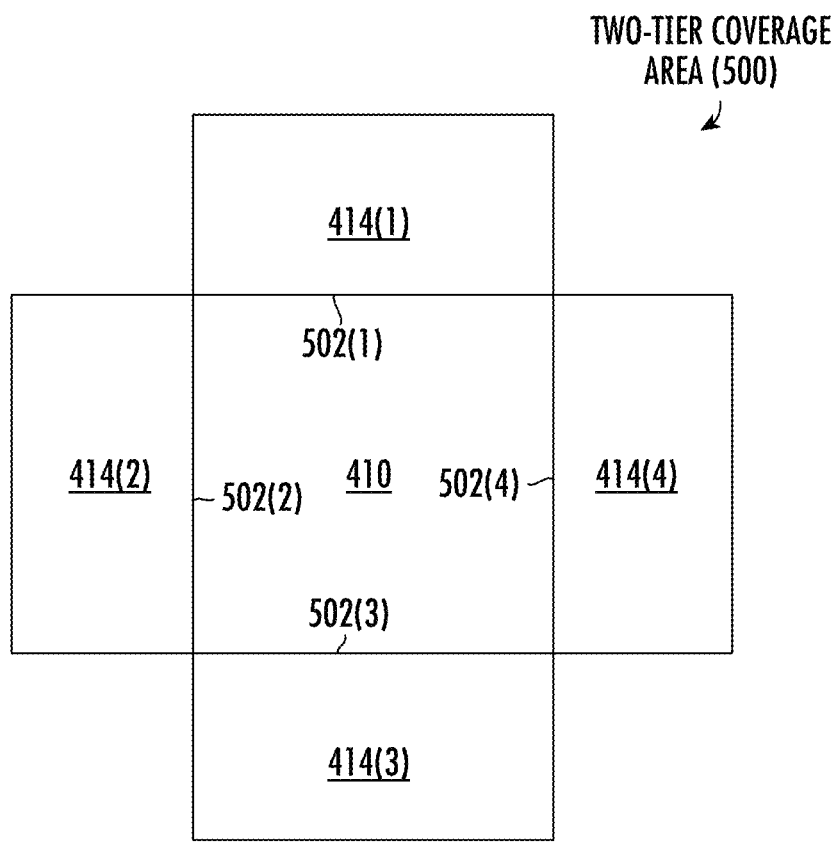
FIG. 5A is a schematic diagram of an exemplary coverage area that may be covered by each antenna array in the wireless device of FIG. 4 based on a two-uniform tiling scheme.
Figure 5B:
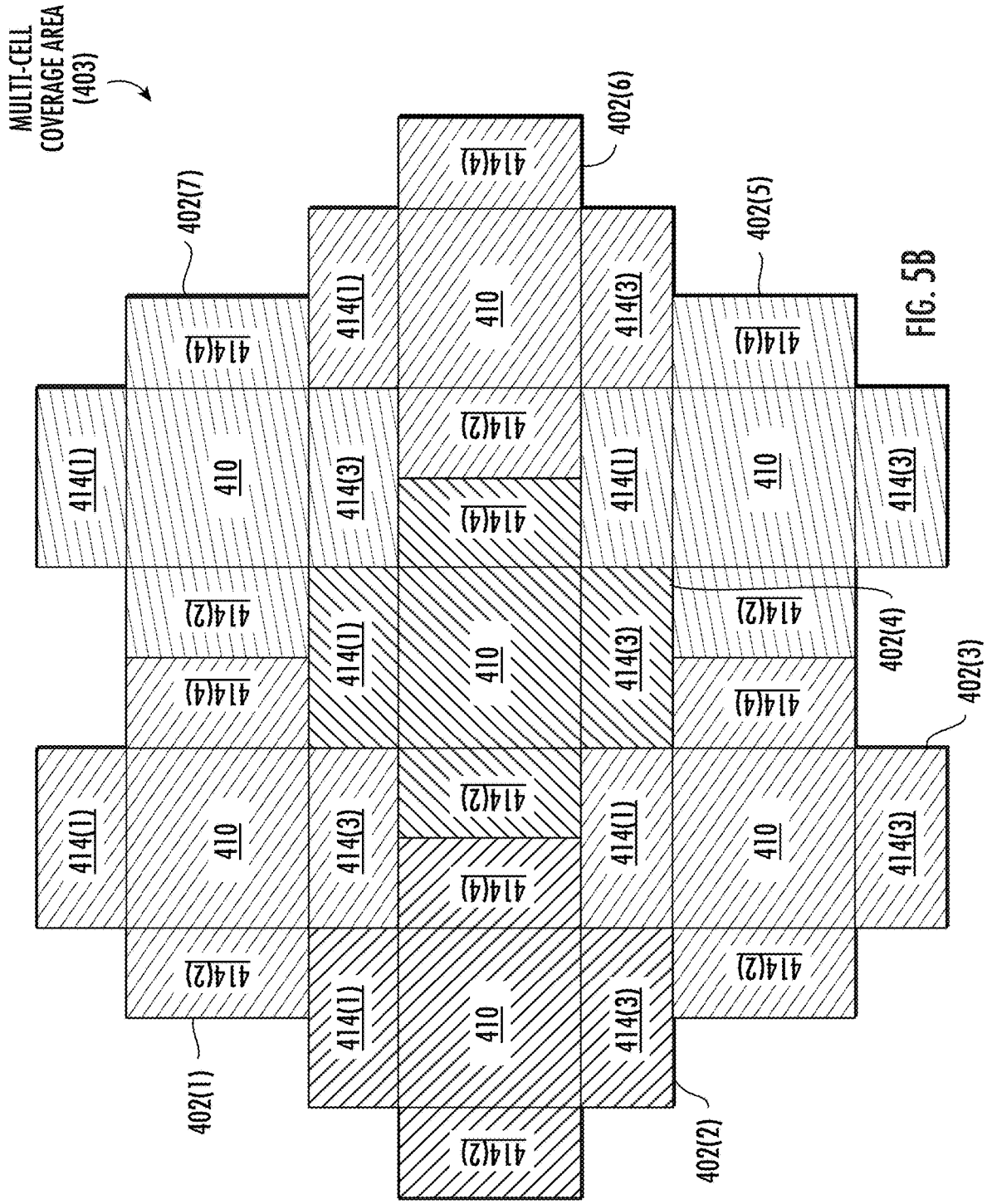
FIG. 5B is a schematic diagram providing an exemplary illustration of the multi-cell coverage area in FIG. 4 that can be covered based on the two-uniform tiling scheme.

In one embodiment, the antenna arrays 404(1)-404(N) in the wireless device 400 may be configured to provide multi-cell multi-beam uniform coverage in accordance with a two-uniform tiling scheme, which is further described in FIGS. 5A and 5B. Common elements between FIGS. 4, 5A, and 5B are shown therein with common element numbers and will not be re-described herein.

FIG. 5A is a schematic diagram of an exemplary coverage area 500 that may be covered by each of the antenna arrays 404(1)-404(N) in the wireless device 400 of FIG. 4 based on the two-uniform tiling scheme. The coverage area 500 includes the main coverage area 410 and four of the side coverage areas 414(1)-414(M) (M≥4), which are denoted as 414(1)-414(4) herein. Herein, each of the main coverage area 410 and the side coverage areas 414(1)-414(4) is a rectangular-shaped coverage area. The side coverage areas 414(1)-414(4) are equal sized coverage areas, each of which is smaller than the main coverage area 410. In a non-limiting example, each of the side coverage areas 414(1)-414(4) is one-half (½) the size of the main coverage area 410. As illustrated in FIG. 5A, each of the side coverage areas 414(1)-414(4) is adjacent to a respective one of four sides 502(1)-502(4) of the main coverage area 410 but does not overlap with the main coverage area 410.

By configuring each of the antenna arrays 404(1)-404(N) to cover the coverage area 500 in a respective one of the coverage cells 402(1)-402(N), the antenna arrays 404(1)-404(N) will collectively cover the multi-cell coverage area 403. In this regard, FIG. 5B is a schematic diagram providing an exemplary illustration of the multi-cell coverage area 403 in FIG. 4 that can be covered based on the two-uniform tiling scheme.

The multi-cell coverage area 403 as shown herein includes seven of the coverage cells 402(1)-402(N) (N≥7), which are denoted as 402(1)-402(7). Notably, the coverage cells 402(1)-402(7) are merely examples for the purpose of illustration. Understandably, the multi-cell coverage area 403 can include any number of the coverage cells 402(1)-402(N). In this embodiment, the coverage cells 402(1)-402(7) do not overlap with each other.

Figure 6A:
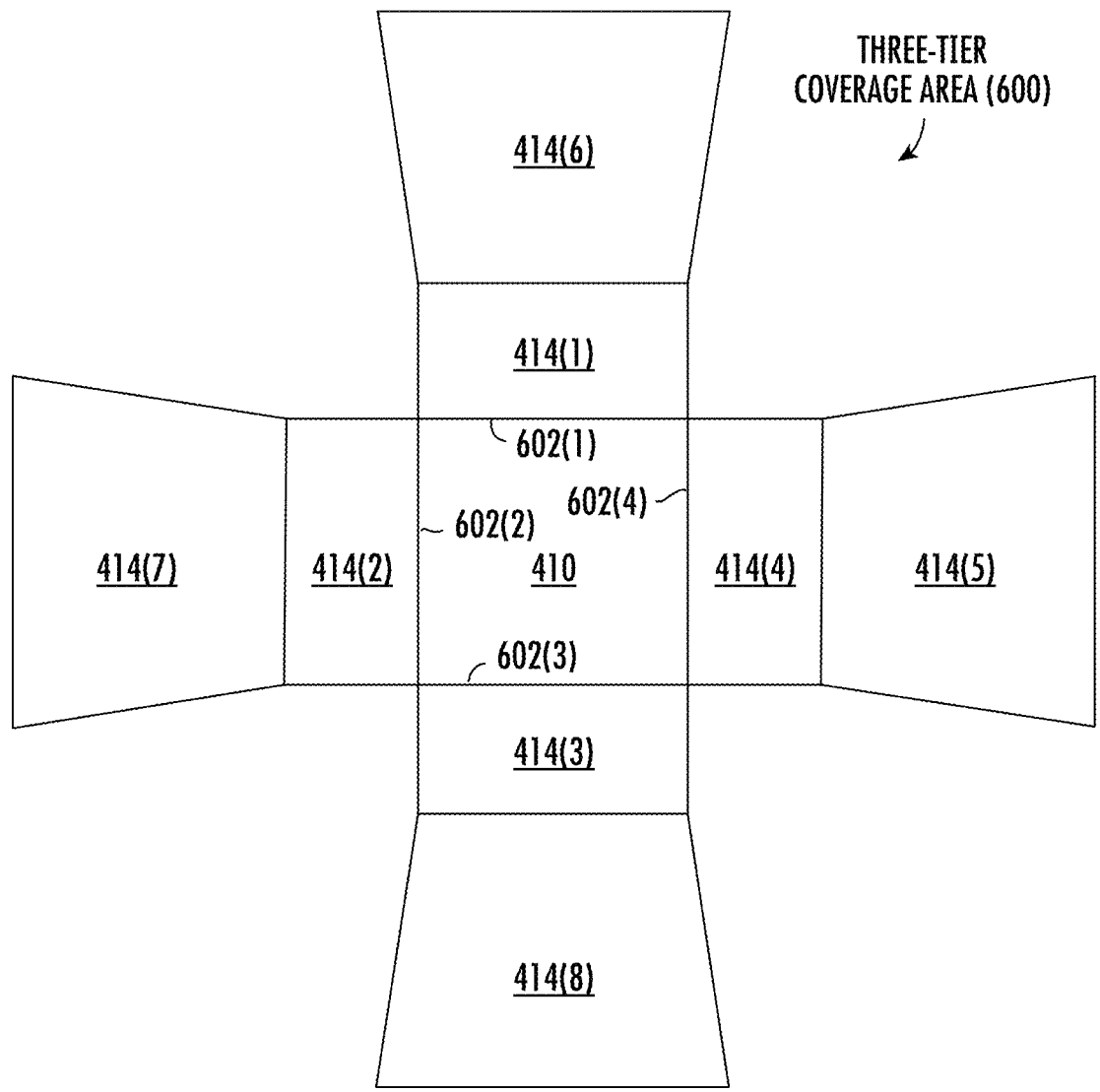
FIG. 6A is a schematic diagram of an exemplary coverage area that may be covered by each antenna array in the wireless device of FIG. 4 based on a three-uniform tiling scheme.
Figure 6B:
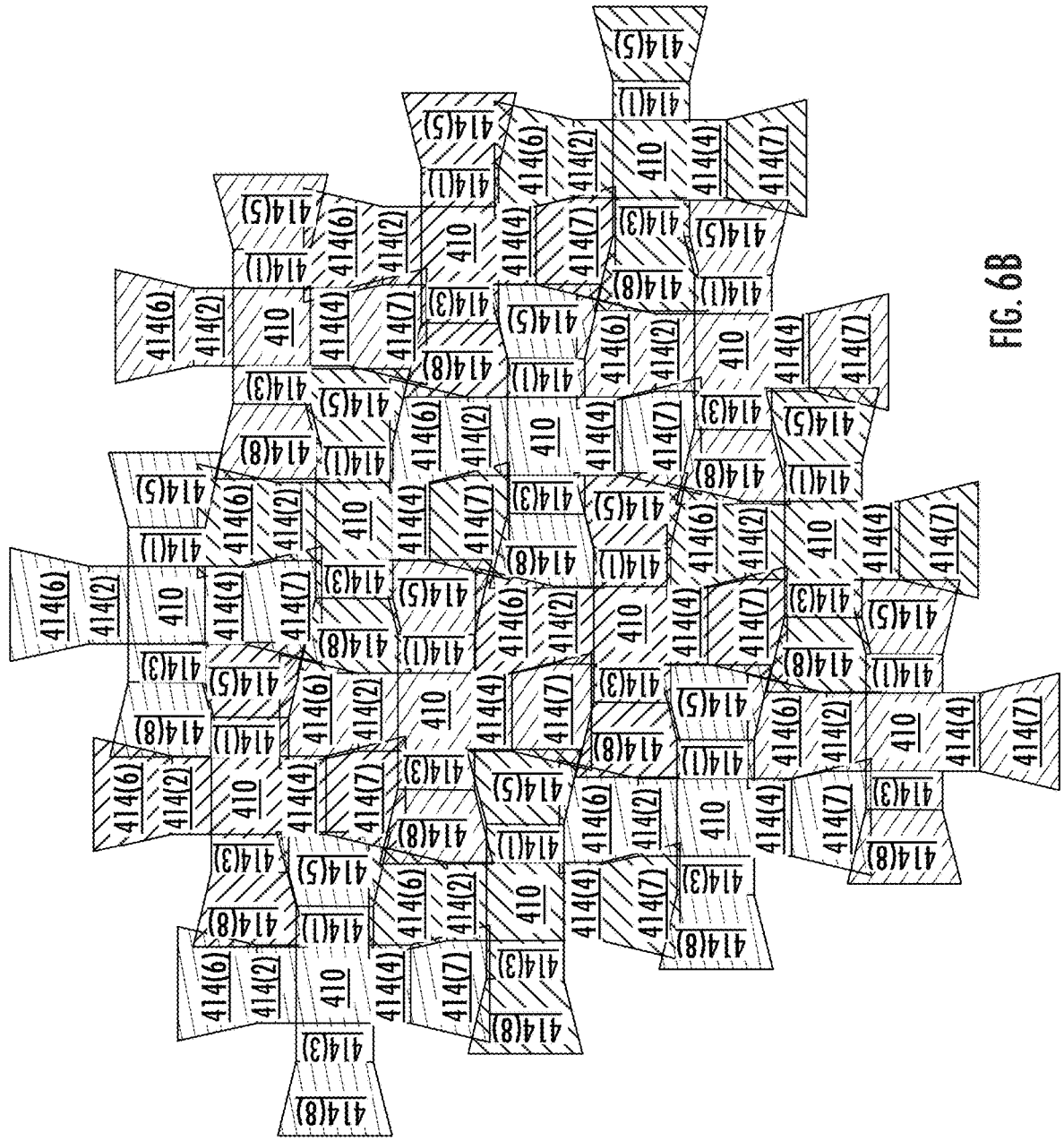
FIG. 6B is a schematic diagram providing an exemplary illustration of the multi-cell coverage area in FIG. 4 that can be covered based on the three-uniform tiling scheme.

In another embodiment, the antenna arrays 404(1)-404(N) in the wireless device 400 may be configured to provide multi-cell multi-beam uniform coverage in accordance with a three-uniform tiling scheme, which is further described in FIGS. 6A and 6B. Common elements between FIGS. 4, 6A, and 6B are shown therein with common element numbers and will not be re-described herein.

FIG. 6A is a schematic diagram of an exemplary coverage area 600 that may be covered by each of the antenna arrays 404(1)-404(N) in the wireless device 400 of FIG. 4 based on the three-uniform tiling scheme. The coverage area 600 includes the main coverage area 410 and eight of the side coverage areas 414(1)-414(M) (M≥8), which are denoted as 414(1)-414(8) herein. More specifically, the side coverage areas 414(1)-414(8) are further divided into four first side coverage areas 414(1)-414(4) and four second side coverage areas 414(5)-414(8).

Herein, each of the main coverage area 410 and the first side coverage areas 414(1)-414(4) is a rectangular-shaped coverage area. The first side coverage areas 414(1)-414(4) are equal sized coverage areas, each of which is smaller than the main coverage area 410. In a non-limiting example, each of the first side coverage areas 414(1)-414(4) is one-half (½) the size of the main coverage area 410. As illustrated in FIG. 6A, each of the first side coverage areas 414(1)-414(4) is adjacent to a respective one of four sides 602(1)-602(4) of the main coverage area 410 but does not overlap with the main coverage area 410.

Each of the second side coverage areas 414(5)-414(8) is a trapezoidal-shaped coverage area. The second side coverage areas 414(5)-414(8) are equal sized coverage areas, each of which is smaller than the main coverage area 410. As illustrated in FIG. 6A, each of the second side coverage areas 414(5)-414(8) is adjacent to a respective one of the first side coverage areas 414(1)-414(4) but does not overlap with any of the main coverage area 410 and the first side coverage areas 414(1)-414(4).

By configuring each of the antenna arrays 404(1)-404(N) to cover the coverage area 600 in a respective one of the coverage cells 402(1)-402(N), the antenna arrays 404(1)-404(N) will collectively cover the multi-cell coverage area 403. In this regard, FIG. 6B is a schematic diagram providing an exemplary illustration of the multi-cell coverage area 403 in FIG. 4 that can be covered based on the three-uniform tiling scheme.

The multi-cell coverage area 403 as shown herein includes any number of the coverage cells 402(1)-402(N). In this embodiment, there may be an overlapping area among the coverage cells 402(1)-402(N).

With reference back to FIG. 4, the wireless device 400 can be controlled based on a plurality of codewords 416(1)-416(K) (K≥N+N×M) in a codebook 418 to provide multi-beam uniform coverage in each of the coverage cells 402(1)-402(N) in accordance with the two-uniform tiling or the three-uniform tiling schemes. Each of the codewords 416(1)-416(K) is predetermined to cause a respective one of the antenna arrays 404(1)-404(N) to form a respective one of the main RF beam 408 and the side RF beams 412(1)-412(N). In a non-limiting example, the codewords 416(1)-416(K) can include N main beam codewords and N×M side beam codewords. The N main beam codewords are each predetermined to cause a respective one of the antenna arrays 404(1)-404(N) to form the respective main RF beam 408. The N×M side beam codewords, on the other hand, are each predetermined to cause a respective one of the antenna arrays 404(1)-404(N) to form a respective one of the side RF beams 412(1)-412(M).

The wireless device 400 may include a memory circuit 420, which can include a storage medium such as random-access memory (RAM), read-only memory (ROM), flash memory, solid-state disk (SSD), as an example, to store the codebook 418. In an embodiment, the codewords 416(1)-416(K) may be generated outside the wireless device 400 and programmed into the memory circuit 420 via a programming interface (not shown), such as a general-purpose input-output (GPIO) interface.

The wireless device 400 can include a control circuit 422, which can be a field-programmable gate array (FPGA) or an application specific integrated circuit (ASIC), as an example. The control circuit 422 is configured to receive a transmission signal 424 (e.g., a control signal and/or a data signal) and replicates the transmission signal 424 to generate one or more weighted transmission signals 426(1)-426(N) based on the codebook 418. Specifically, to cause any of the antenna arrays 404(1)-404(N) to form the respective main RF beam 408, the control circuit 422 selects a respective one of the N main beam codewords from the codebook 418 and generates a respective one of the weighted transmission signals 426(1)-426(N) based on the selected main beam codeword. Similarly, to cause any of the antenna arrays 404(1)-404(N) to form a respective one of the side RF beams 412(1)-412(M), the control circuit 422 selects a respective one of the N×M side beam codewords from the codebook 418 and generates a respective one of the weighted transmission signals 426(1)-426(N) based on the selected side beam codeword.

Figure 7:
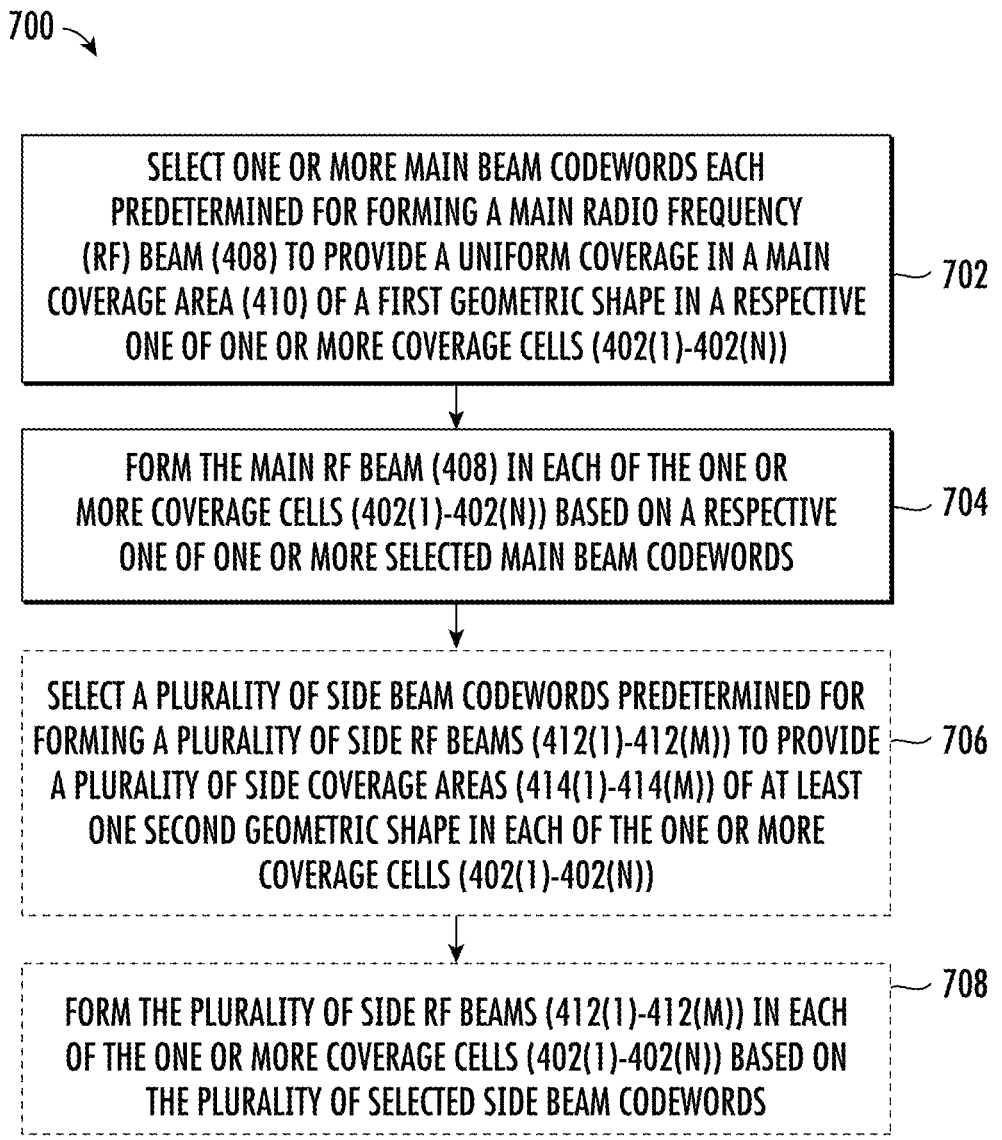
FIG. 7 is a flowchart of an exemplary process that can be employed by the wireless device of FIG. 4 for providing multi-beam uniform coverage in the coverage cells.

The wireless device 400 may be configured to provide multi-beam uniform coverage in the coverage cells 402(1)-402(N) based on a process. In this regard, FIG. 7 is a flowchart of an exemplary process 700 that can be employed by the wireless device 400 of FIG. 4 for providing multi-beam uniform coverage in the coverage cells 402(1)-402(N).

Herein, the control circuit 422 is configured to select one or more main beam codewords each predetermined for forming a main RF beam 408 to provide a uniform coverage in a main coverage area 410 of a first geometric shape in a respective one of the coverage cells 402(1)-402(N) (block 702). Accordingly, the control circuit 422 can cause the antenna arrays 404(1)-404(N) to form the main RF beam 408 in each of the coverage cells 402(1)-402(N) based on a respective one of the selected main beam codewords (block 704).

The control circuit 422 may also select a plurality of side beam codewords predetermined for forming the side RF beams 412(1)-412(M) to cover the side coverage areas 414(1)-414(M) of the second geometric shape in each of the coverage cells 402(1)-402(N) (block 706). Accordingly, the control circuit 422 may cause the antenna arrays 404(1)-404(N) to form the side RF beams 412(1)-412(M) in each of the coverage cells 402(1)-402(N) based on the selected side beam codewords (block 708).

In an embodiment, it is possible to design each of the codewords 416(1)-416(K) in the codebook 418 based on a codebook design procedure. In this regard, FIGS. 8A-8D are schematic diagrams illustrating a design procedure for determining the codebook 418 stored in the wireless device 400 of FIG. 4. Common elements between FIGS. 4 and 8A-8D are shown therein with common element numbers and will not be re-described herein.

Figure 8A:
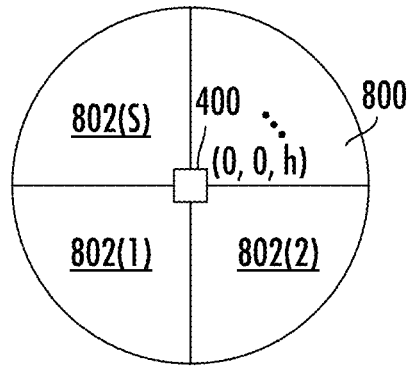
FIGS. 8A-8D are schematic diagrams illustrating a design procedure for determining a codebook that is stored in the wireless device of FIG. 4.

FIG. 8A represents a first step of the design procedure. Herein, the wireless device 400 is assumed to be mounted on an indoor ceiling with a height h from a coverage evaluation level (e.g., ground). Accordingly, the wireless device 400 is assumed to be at a center (x=0, y=0, z=h) of a coverage cell 800 formed by the wireless device 400. In this regard, the coverage 800 can be any one of the coverage cells 402(1)-402(N) covered by any one of the antenna arrays 404(1)-404(N) in FIG. 4. The coverage cell 800 is first divided into a plurality of sectors 802(1)-802(S). Herein, S represents a sum of the main RF beam 408 and the side RF beams 412(1)-412(M) that are formed by one of the antenna arrays 404(1)-404(N). In other words, S=M+1.

Figure 8B:
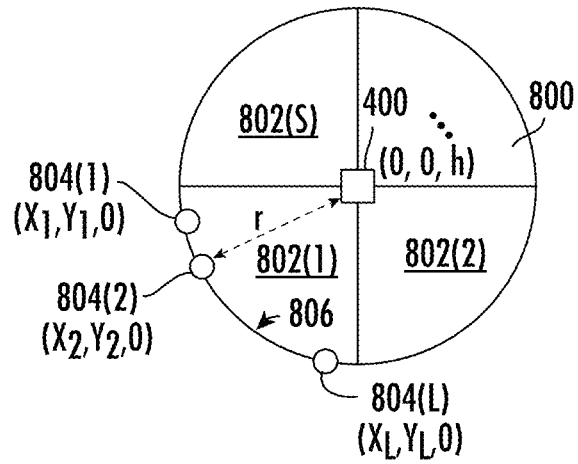

FIG. 8B represents a second step of the design procedure. Herein, a plurality of points 804(1)-804(L) is placed on a perimeter 806 of the sector 802(1) with uniform spacing and an equal distance r to the center (x=0, y=0, z=h) of the coverage cell 800. Notably, each of the points 804(1)-804(L) is located on the ground. In other words, each of the points 804(1)-804(L) has a respective coordinate ($x_j$, $y_j$, $z_j$=0), wherein $1 \leq j \leq L$.

Figure 8C:
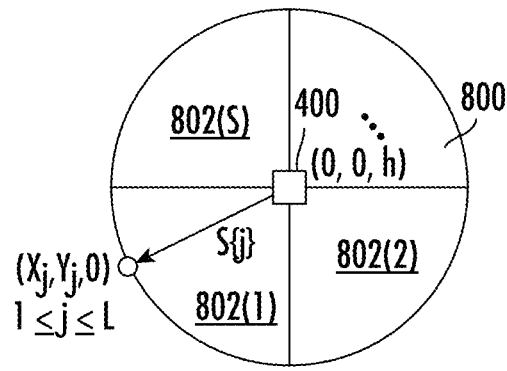

FIG. 8C represent a third step of the design procedure. In the selected one of the sectors 802(1)-802(S), calculate a direction ($\phi_j$, $\theta_j$) ($1 \leq j \leq L$) in spherical coordinates (azimuth $\phi$ and elevation $\theta$) from the center (x=0, y=0, z=h) to a respective coordinate ($x_j$, $y_j$, $z_j$) of each of the points 804(1)-804(L) based on equation (Eq. 1) below.

$$\phi_j = \tan^{-1}(y'_j/x'_j), \theta_j = \sin^{-1}(z'_j/d) \ (1 \leq j \leq L) \quad \text{(Eq. 1)}$$

$$(x'_j, y'_j, z'_j)^T = R * (x_j, y_j, -h)^T,$$

$$R = \begin{bmatrix} 0 & 0 & -1 \\ 0 & 0 & 0 \\ 1 & 0 & 0 \end{bmatrix} d = \sqrt{|x_j|^2 + |y_j|^2 + |z_j|^2},$$

$$T = \text{Transpose Operation}$$

Next, calculate steering vector coefficients $S_n\{j\}$ for each of the antenna elements 406 (denoted as "n") in one of the antenna arrays 404(1)-404(N) for the calculated direction ($\phi_j$, $\theta_j$) based on equation (Eq. 2).

$$\psi_n = \frac{2\pi}{\lambda} * [x_n * \sin(\theta_j) * \cos(\phi_j) + y_n * \sin(\phi_j) * \cos(\theta_j) + z_n * \sin(\phi_j)] \quad \text{(Eq. 2)}$$

$$S_n\{j\} = e^{-i\psi_n}$$

In the equation (Eq. 2) above, $\lambda$ represents wavelength, ($x_n$, $y_n$, $z_n$) represents n-th element with respect to the origin of the respective antenna array.

Figure 8D:
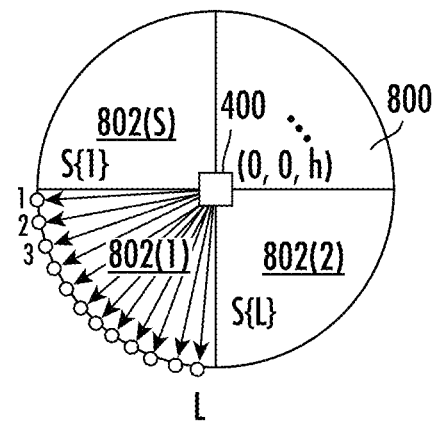

FIG. 8D represent a fourth step of the design procedure. In the selected one of the sectors 802(1)-802(S), calculate beam coefficients $v_n$ by summing all steering vectors coefficients $S_n\{j\}$ ($1 \leq j \leq L$) with normalized amplitude, as shown in equation (Eq. 3) below.

$$v_n \Sigma_{j=1}^L S_n\{j\}$$

$$v_n = v_n/|v_n| \quad \text{(Eq. 3)}$$

The steps as described in FIGS. 8B-8D are repeated for remaining vectors 802(2)-802(S). Notably, the design procedure as described in FIGS. 8A-8D can be further validated by a series of mathematical equations as described next.

In addition to the rectangular-shaped main coverage area 410 and the rectangular-shaped side coverage areas 414(1)-414(M), the main RF beam 408 and the side RF beams 412(1)-412(M) can be designed according to symmetrical values of a codeword (e.g., symmetrical phases of the set of complex coefficients of the codeword), as described below to make a nondeterministic polynomial time acceptable (NP hard) problem solvable by fast numerical methods.

An array factor (AF) of an M×N rectangular array of uniformly spaced antenna elements with given control coefficients $A_{mn}$ can be defined in the following equation.

$$AF(\Theta, \phi) = \sum_{n=0}^{N-1}\sum_{m=0}^{M-1} A_{mn} e^{jk_0(md_x \sin\Theta\cos\phi + nd_y \sin\Theta\sin\phi)}$$

Herein, the coordinate of a corner antenna element is (0, 0) and the rest of the antenna elements are spaced at $d_x$ and $d_y$ distance in x and y direction, respectively. In the equation above, M and N are integers, $A_{mn}$ is the complex-valued control coefficient that determines the beam direction and pattern in the azimuthal ($\phi$) and elevation ($\theta$) directions, $k_0=2\pi/\lambda$ is the free-space wavevector. Overall, there are M×N control coefficients, which may be rewritten as in the equations below by separating the x and y originated parts without losing generality.

$$A_{mn} = B_{mn} e^{j\psi_{mn}}, \text{ where } B_{mn} \text{ is real number}$$

$$\psi_{mn} = \psi_{x_{mn}} + \psi_{y_{mn}}$$

$$B_{mn} = B_{x_{mn}} B_{y_{mn}}$$

For pinpoint beamforming, it is possible to perform totally independent beamforming design for elements in x and y orientation. For example, for M×1 and N×1 arrays resolving directivity in xz and yz planes separately. However, for general beamforming that targets some arbitrary radiation pattern, such a separation approach would not provide a suitable solution. On the other hand, the limitation resulted from the separation approach is equivalent to forcing a rectangular beam coverage, which is what each of the rectangular-shaped main coverage area 410 and the rectangular-shaped side coverage areas 414(1)-414(M) is intended to be. Therefore, it is possible to define the above-mentioned separation approach as below.

$$\psi_{y_{mn}} = \psi_{y_n} \forall m \in [0, M-1]$$

$$\psi_{x_{mn}} = \psi_{x_m} \forall n \in [0, N-1]$$

$$\psi_{mn} = \psi_{x_m} + \psi_{y_n}$$

In other words, a rectangular-shaped beam can be designed by two separate M×1 and N×1 uniform linear arrays (ULAs). The separate beamforming is followed by an outer product of two complex vectors to get M×N matrix of control coefficients for the array of M×N antenna elements, such as each of the antenna arrays 404(1)-404(N).

$$\left(e^{j\psi_{x_0}}, \ldots, e^{j\psi_{x_{M-1}}}\right)_{M\times 1} \otimes \left(e^{j\psi_{y_0}}, \ldots, e^{j\psi_{y_{N-1}}}\right)_{N\times 1} = \begin{pmatrix} e^{j\psi_{x_0}}e^{j\psi_{y_0}} & \ldots & e^{j\psi_{x_0}}e^{j\psi_{y_{N-1}}} \\ \vdots & \ddots & \vdots \\ e^{j\psi_{x_{M-1}}}e^{j\psi_{y_0}} & \ldots & e^{j\psi_{x_{M-1}}}e^{j\psi_{y_{N-1}}} \end{pmatrix}_{M\times N}$$

$$= \begin{pmatrix} e^{j\psi_{0,0}} & \ldots & e^{j\psi_{0,N-1}} \\ \vdots & \ddots & \vdots \\ e^{j\psi_{M-1,0}} & \ldots & e^{j\psi_{M-1,N-1}} \end{pmatrix}_{M\times N}$$

For the main RF beam 408 formed by a respective one of the antenna arrays 404(1)-404(N) mounted on an indoor ceiling and located at a center of a respective one of the coverage cells 402(1)-402(N) (e.g., a room), both M×1 and N×1 vectors will be symmetric due to coverage symmetry relative to position of the respective antenna array. However, for each of the side RF beams 412(1)-412(M), only one of the M×1 and N×1 vectors will be symmetrical.

Overall, for rectangular-shaped beams, such as the main RF beam 408 and the side RF beams 412(1)-412(M) formed herein, it is generally possible to reduce the number of parameters from M×N to M+N. Moreover, for the main RF beam 408 where both M and N vectors are symmetrical, it is possible to further reduce the number of parameters to ½(M+N). As for each of the side RF beams 412(1)-412(M), since only one of the M and N vectors is symmetrical, the number of parameters can only be reduced to either ½M+N or M+½N.

In an embodiment, a method for providing rectangular-shaped beamforming coverage is to relax the general pattern synthesis problem complexity to the level of pinpoint beamforming, while still achieving and utilizing rectangular-shaped beam synthesis properties to provide the desired coverage by multi-uniform tiling. The method disclosed herein allows fast redesign for any new subarea and/or room size.

One possible option is to control only phases to avoid potential energy loss resulting from amplitude change in a control coefficient, as shown below.

$$B_{mn} = B_{hd\ x_{mn}} = B_{y_{mn}} = 1$$

Thus, a double summation over a product of two finite series can be rewritten as a product of summations of the two finite series, as shown below.

$$\sum_{n=0}^{N-1}\sum_{m=0}^{M-1} y_n x_m = \left(\sum_{n=0}^{N-1} y_n\right)\left(\sum_{m=0}^{M-1} x_m\right)$$

$$AF(\Theta, \phi, \psi_{y_0}, \ldots, \psi_{y_{N-1}}, \psi_{x_0}, \ldots, \psi_{x_{M-1}}) =$$

$$\sum_{n=0}^{N-1} e^{j\psi_{y_n}} e^{jk(nd_y\sin\Theta\sin\phi)} \sum_{m=0}^{M-1} e^{j\psi_{x_m}} e^{jk(md_x\sin\Theta\cos\phi)}$$

$$AF(\Theta, \phi, \psi_{y_0}, \ldots, \psi_{y_{N-1}}, \psi_{x_0}, \ldots, \psi_{x_{M-1}}) =$$

$$\sum_{n=0}^{N-1} e^{jk(nd_y\sin\Theta\sin\phi+\psi_{y_n})} \sum_{m=0}^{M-1} e^{jk(md_x\sin\Theta\cos\phi+\psi_{x_m})}$$

$$|AF(\Theta, \phi, \psi_{y_0}, \ldots, \psi_{y_{N-1}}, \psi_{x_0}, \ldots, \psi_{x_{M-1}})| =$$

$$\left|\sum_{n=0}^{N-1} e^{jk(nd_y\sin\Theta\sin\phi+\psi_{y_n})}\right| \left|\sum_{m=0}^{M-1} e^{jk(md_x\sin\Theta\cos\phi+\psi_{x_m})}\right|$$

The equation below can be used to evaluate radiated power for a specific range of $\theta$ and $\phi$.

$$|AF(\Theta, \phi, \psi_{y_0}, \ldots, \psi_{y_{N-1}}, \psi_{x_0}, \ldots, \psi_{x_{M-1}})| =$$

$$\left|\sum_{n=0}^{N-1} e^{jk(nd_y\sin\Theta\sin\phi+\psi_{y_n})}\right| \left|\sum_{m=0}^{M-1} e^{jk(md_x\sin\Theta\cos\phi+\psi_{x_m})}\right|$$

To illustrate the rectangular beam approach, first set the azimuth $\phi$ to zero-degree $\phi=0°$ to get $\sin\phi=0$ and $\cos\phi=1$.

$$AF(\Theta, \psi_{y_0}, \ldots, \psi_{y_{N-1}}, \psi_{x_0}, \ldots, \psi_{x_{M-1}}) = AF(\Theta, \phi=0, \psi_{y_0}, \ldots,$$
$$\psi_{y_{N-1}}, \psi_{x_0}, \ldots, \psi_{x_{M-1}})$$
$$= \sum_{n=0}^{N-1} e^{jk(\psi_{y_n})} \sum_{m=0}^{M-1} e^{jk(md_x\sin\Theta+\psi_{x_m})}$$

$$|AF(\Theta, \psi_{y_0}, \ldots, \psi_{y_{N-1}}, \psi_{x_0}, \ldots, \psi_{x_{M-1}})| = |AF(\Theta, \phi=0, \psi_{y_0}, \ldots,$$
$$\psi_{y_{N-1}}, \psi_{x_0}, \ldots, \psi_{x_{M-1}})|$$
$$= \left|\sum_{n=0}^{N-1} e^{jk(\psi_{y_n})}\right|$$
$$\left|\sum_{m=0}^{M-1} e^{jk(md_x\sin\Theta+\psi_{x_m})}\right|$$

By setting the azimuth $\phi$ to zero-degree, optimization dependency on the elevation $\theta$ can be done only by $\psi_{x_m}$. In case all $\psi_{y_n}$=const, the maximum of $$\left|\sum_{n=0}^{N-1} e^{jk(\psi_{y_n})}\right|$$

will generate rectangular-shaped narrow beam. Alternatively, when $\psi_{y_n}$ set according to azimuth of 90 degrees ($\phi=90°$), we will get $\sin\phi=1$ and $\cos\phi=0$.

$$AF(\Theta, \psi_{y_0}, \ldots, \psi_{x_0}, \ldots, \psi_{x_{M-1}}) = AF(\Theta, \phi=90, \psi_{y_0}, \ldots, \psi_{y_{N-1}},$$
$$\psi_{x_0}, \ldots, \psi_{x_{M-1}})$$
$$= \sum_{n=0}^{N-1} e^{jk(nd_y\sin\Theta+\psi_{y_n})} \sum_{m=0}^{M-1} e^{jk(\psi_{x_m})}$$

$$|AF(\Theta, \psi_{y_0}, \ldots, \psi_{y_{N-1}}, \psi_{x_0}, \ldots, \psi_{x_{M-1}})| = |AF(\Theta, \phi=90, \psi_{y_0},$$
$$\ldots, \psi_{y_{N-1}},$$
$$\psi_{x_0}, \ldots, \psi_{x_{M-1}})|$$
$$= \left|\sum_{n=0}^{N-1} e^{jk(nd_y\sin\Theta+\psi_{y_n})}\right|$$
$$\left|\sum_{m=0}^{M-1} e^{jk(\psi_{x_m})}\right|$$

As can be seen from the equations above, for $\phi=90°$, optimization dependency on elevation ($\theta$) should only be done by $\psi_{y_n}$. As in the $\phi=0°$ case, $\psi_{x_m}$=const will achieve maximum for $$\left|\sum_{m=0}^{M-1} e^{jk(\psi_{x_m})}\right|,$$

but will generate a beam with narrow beamwidth, which has a higher average distributed energy, instead of a desired beam with a wider beamwidth, which has a lower average distributed energy compared to the beam with narrow beamwidth.

To resolve only the M×1 or N×1 part and omit the part that does not depend on the elevation ($\theta$), a relative $\widetilde{AF}$ defined only for N×1 case can be substituted by M.

$$|\widetilde{AF}(\Theta)| = |\widetilde{AF}(\Theta, \psi_0, \ldots, \psi_{N-1})| = \left|\sum_{n=0}^{N-1} e^{jk(nd_y \sin\Theta + \psi_n)}\right|$$

Assuming that a target function can provide equal received power and provide fair coverage at an area defined by [−w, w] in x direction and the same [−w, w] in the y direction, with array coordinates of (0, 0, h). A range of elevations can be calculated, for example, by $\Theta \in [\Theta_{low}, \Theta_{high}]$, where $\Theta \in [\Theta_{low}, \Theta_{high}]$, and h represents height of the antenna array installation relative to a height of coverage elevation level (e.g., ground) for the symmetrical case of the main RF beam 408.

Assuming free space path loss, then $$L = \left(\frac{4\pi d}{\lambda}\right)^2, d = \frac{h}{\cos\Theta}$$

Herein, d represents three-dimensional (3D) distance between the antenna array and the coverage point at which the received power level is evaluated. A normalized expected received power level can be described as:

$$\frac{(|\widetilde{AF}(\Theta)|)^2}{L} =$$

$$\frac{(|\widetilde{AF}(\Theta)|)^2}{\left(\frac{4\pi d}{\lambda}\right)^2} = \frac{(|\widetilde{AF}(\Theta)|)^2}{\left(\frac{4\pi d}{\lambda}\right)^2} = \frac{(|\widetilde{AF}(\Theta)|)^2}{\left(\frac{4\pi h}{\lambda \cos\Theta}\right)^2} = (|\widetilde{AF}(\Theta)|)^2 (\cos\Theta)^2 \left(\frac{\lambda}{3\pi h}\right)^2$$

In the above equation, a multiplication by $(\cos\theta)^2$ represents an increase of power loss due to increased distance, as in an omni-directional single element antenna. Notably, the equation below should be used in order to consider a gain of antenna element $G(\Theta)$, which will not be described herein for the sake of simplicity.

$$(\widetilde{AF}(\Theta) \mid G(\Theta))^2 (\cos\Theta)^2 \left(\frac{\lambda}{3\pi h}\right)^2$$

To evaluate the received power at a plane of the coverage evaluation level in the range of interest $[\Theta_{low}, \Theta_{high}]$, an integration may be performed as follows.

$$\int_{\Theta=\Theta_{low}}^{\Theta_{high}} (|AF(\Theta)|)^2 (\cos\Theta)^2 \left(\frac{\lambda}{3\pi h}\right)^2 d\Theta$$

By defining the local optimization problem for N×1 or M×1, there will be N or M free parameters $\psi_n$. As stated above, it is possible to further reduce the free parameters $\psi_n$ to ½N or ½M in the symmetry case. Thus, the problem can be redefined by searching for a set of $\psi_n$ to maximize a target function under certain constraints.

In one embodiment, it is possible to maximize the target function by maximizing overall total energy as measured at the plane of the coverage evaluation level, as shown in equation (Eq. 4) below.

$$\text{Maximize}\left\{\int_{\Theta=\Theta_{low}}^{\Theta_{high}} (|AF(\Theta, \psi_0, \ldots, \psi_{N-1})|)^2 (\cos\Theta)^2 \left(\frac{\lambda}{3\pi h}\right)^2 d\Theta\right\} \quad \text{(Eq. 4)}$$

In another embodiment, it is possible to maximize the target function by maximizing minimal energy as measured at the plane of the coverage evaluation level, as shown in equation (Eq. 5) below.

Maximize (Eq. 5)

$$\left\{\min\left((|\widetilde{AF}(\Theta, \psi_0, \ldots, \psi_{N-1})|)^2 (\cos\Theta)^2 \left(\frac{\lambda}{3\pi h}\right)^2\right) \forall \Theta \in [\Theta_{low}, \Theta_{high}]\right\}$$

In another embodiment, it is possible to maximize the target function by maximizing maximal energy as measured at the plane of the coverage evaluation level, as shown in equation (Eq. 6) below.

$$\text{Maximum}\left\{\max\left((|\widetilde{AF}(\Theta, \psi_0, \ldots, \psi_{N-1})|)^2 (\cos\Theta)^2 \left(\frac{\lambda}{3\pi h}\right)^2\right)\right. \quad \text{(Eq. 6)}$$

$$\left. \forall \Theta \in [\Theta_{low}, \Theta_{high}]\right\}$$

The constraint $\forall \Theta \in [\Theta_{low}, \Theta_{high}]$ can be generally categorized into fairness constraints and undesired radiation constraints. The fairness constraints and the undesired radiation constraints, when applied individually or in combination, can help manage fairness of coverage and/or restrict radiation in undesired directions.

In one embodiment, the fairness constraint can be defined based on a desired max/min ratio.

$$\forall \Theta \in [\Theta_{low}, \Theta_{high}],$$

$$\frac{\max\left((|\widetilde{AF}(\Theta, \psi_0, \ldots, \psi_{N-1})|)^2 (\cos\Theta)^2 \left(\frac{\lambda}{3\pi h}\right)^2\right)}{\min\left((|\widetilde{AF}(\Theta, \psi_0, \ldots, \psi_{N-1})|)^2 (\cos\Theta)^2 \left(\frac{\lambda}{3\pi h}\right)^2\right)} < \text{desired ratio}$$

In another embodiment, the fairness constraint can be defined based on a desired standard fairness level.

$$\forall \Theta \in [\Theta_{low}, \Theta_{high}],$$

$$std\left(\left(|\vec{AF}(\Theta, \psi_0, \ldots, \psi_{N-1})|\right)^2 (\cos\Theta)^2 \left(\frac{\lambda}{3\pi h}\right)^2\right) < \text{desired } std \text{ fairness level}$$

In another embodiment, the fairness constraint can be defined based on a desired high peak-to-average ratio (PAR).

$$\forall \Theta \in [\Theta_{low}, \Theta_{high}],$$

$$\frac{\max\left(\left(|\vec{AF}(\Theta, \psi_0, \ldots, \psi_{N-1})|\right)^2 (\cos\Theta)^2 \left(\frac{\lambda}{3\pi h}\right)^2\right)}{\operatorname{mean}\left(\left(|\vec{AF}(\Theta, \psi_0, \ldots, \psi_{N-1})|\right)^2 (\cos\Theta)^2 \left(\frac{\lambda}{3\pi h}\right)^2\right)} < \text{desired high } PAR$$

In another embodiment, the fairness constraint can be defined based on a desired low PAR.

$$\forall \Theta \in [\Theta_{low}, \Theta_{high}],$$

$$\frac{\operatorname{mean}\left(\left(|\vec{AF}(\Theta, \psi_0, \ldots, \psi_{N-1})|\right)^2 (\cos\Theta)^2 \left(\frac{\lambda}{3\pi h}\right)^2\right)}{\min\left(\left(|\vec{AF}(\Theta, \psi_0, \ldots, \psi_{N-1})|\right)^2 (\cos\Theta)^2 \left(\frac{\lambda}{3\pi h}\right)^2\right)} < \text{desired lower } PAR$$

The above fairness constraints may be applied individually or in any combination to maximize the target function. Notably, it may be possible to omit the fairness constraint when the target function is maximized based on the equation (Eq. 5), as the target function is still protected against so-called "coverage holes." However, the fairness constraint should be applied when the target function is maximized based on the equation (Eq. 4) or the equation (Eq. 6).

In one embodiment, the undesired radiation constraint can be defined based on a simple upper limit being lower than a desired level.

$$\forall \Theta \notin [\Theta_{low}, \Theta_{high}],$$

$$\max\left(\left(|\vec{AF}(\Theta, \psi_0, \ldots, \psi_{N-1})|\right)^2 (\cos\Theta)^2 \left(\frac{\lambda}{3\pi h}\right)^2\right) < \text{desired level}$$

In another embodiment, the undesired radiation constraint can be defined based on a total integrated upper limit being lower than a desired level.

$$\Theta \notin [\Theta_{low}, \Theta_{high}] \,\&\, \Theta \in [\Theta_{undesired\ low}, \Theta_{undesired\ high}]$$

$$[\Theta_{low}, \Theta_{high}] \cap [\Theta_{undesired\ low}, \Theta_{undesired\ high}] = \emptyset$$

$$\int_{\Theta=\Theta_{undesired\ low}}^{\Theta_{undesired\ high}} (|AF(\Theta, \psi_0, \ldots, \psi_{N-1})|)^2 (\cos\Theta)^2 \left(\frac{\lambda}{3\pi h}\right)^2 d\Theta < \text{desired level}$$

In another embodiment, the undesired radiation constraint can be defined based on a normalized upper limit being lower than a desired level.

$$\forall \Theta \notin [\Theta_{low}, \Theta_{high}],$$

$$\frac{\max\left(\left(|\vec{AF}(\Theta, \psi_0, \ldots, \psi_{N-1})|\right)^2 (\cos\Theta)^2 \left(\frac{\lambda}{3\pi h}\right)^2\right)}{\forall \Theta \in [\Theta_{low}, \Theta_{high}],\ \min\left(\left(|\vec{AF}(\Theta, \psi_0, \ldots, \psi_{N-1})|\right)^2 (\cos\Theta)^2 \left(\frac{\lambda}{3\pi h}\right)^2\right)} < \text{desired level}$$

In another embodiment, the undesired radiation constraint can be defined based on a normalized total integrated upper limit being lower than a desired ratio.

$$\Theta \notin [\Theta_{low}, \Theta_{high}] \,\&\, \Theta \in [\Theta_{undesired\ low}, \Theta_{undesired\ high}]$$

$$[\Theta_{low}, \Theta_{high}] \cap [\Theta_{undesired\ low}, \Theta_{undesired\ high}] = \emptyset$$

$$\frac{\int_{\Theta=\Theta_{undesired\ low}}^{\Theta_{undesired\ high}} (|AF(\Theta, \psi_0, \ldots, \psi_{N-1})|)^2 (\cos\Theta)^2 \left(\frac{\lambda}{3\pi h}\right)^2 d\Theta}{\int_{\Theta=\Theta_{low}}^{\Theta_{high}} (|AF(\Theta, \psi_0, \ldots, \psi_{N-1})|)^2 (\cos\Theta)^2 \left(\frac{\lambda}{3\pi h}\right)^2 d\Theta} < \text{desired ratio}$$

In another embodiment, the undesired radiation constraint can be defined based on a normalized limit for an average being lower than a desired level.

$$\forall \Theta \notin [\Theta_{low}, \Theta_{high}],$$

$$\frac{\operatorname{mean}\left(\left(|\vec{AF}(\Theta, \psi_0, \ldots, \psi_{N-1})|\right)^2 (\cos\Theta)^2 \left(\frac{\lambda}{3\pi h}\right)^2\right)}{\forall \Theta \in [\Theta_{low}, \Theta_{high}],\ \min\left(\left(|\vec{AF}(\Theta, \psi_0, \ldots, \psi_{N-1})|\right)^2 (\cos\Theta)^2 \left(\frac{\lambda}{3\pi h}\right)^2\right)} < \text{desired level}$$

In another embodiment, the undesired radiation constraint can be defined as a multiple range constraint. An example is provided below based on the undesired radiation constraint defined based on the simple upper limit. It should be appreciated that the multiple range constraint can also be applied to any other undesired radiation constraints described above.

$$S_1 \equiv \Theta \notin [\Theta_{low}, \Theta_{high}] \,\&\, \Theta \in [\Theta_{undesired\ low\ 1}, \Theta_{undesired\ high\ 1}]$$

$$S_2 \equiv \Theta \notin [\Theta_{low}, \Theta_{high}] \,\&\, \Theta \in [\Theta_{undesired\ low\ 2}, \Theta_{undesired\ high\ 2}]$$

$$S_1 \cap S_2 = \emptyset,$$

$$S_1 \cap [\Theta_{low}, \Theta_{high}] = \emptyset,$$

$$S_2 \cap [\Theta_{low}, \Theta_{high}] = \emptyset,$$

$$\forall \Theta \in S_1,$$

$$\max\left(\left(|\vec{AF}(\Theta, \psi_0, \ldots, \psi_{N-1})|\right)^2 (\cos\Theta)^2 \left(\frac{\lambda}{3\pi h}\right)^2\right) < \text{desired level 1}$$

$$\forall \Theta \in S_2,$$

$$\max\left(\left(|\vec{AF}(\Theta, \psi_0, \ldots, \psi_{N-1})|\right)^2 (\cos\Theta)^2 \left(\frac{\lambda}{3\pi h}\right)^2\right) < \text{desired level 2}$$

The above undesired radiation constraints may be applied individually or in any combination to maximize the target function. In an embodiment, it may also be possible not to apply the undesired radiation constraint when maximizing the target function, knowing that doing so may lead to a higher level of interference. However, some level of interference may also be desired for supporting inter-beam and/or inter-cell mobility.

It may also be possible to define an empirical target function and maximize the empirical target function based on a mixture of the fairness constraints and the undesired radiation constraints. In a non-limiting example, it is possible to maximize the target function, as defined in the equation (Eq. 4) by applying the fairness constraints defined based on the desired standard fairness level and the undesired radiation constraint defined based on the total integrated upper limit being lower than a desired level, as illustrated below.

$$C_1 = \int_{\Theta=\Theta_{low}}^{\Theta_{high}} (|AF(\Theta, \psi_0, \ldots, \psi_{N-1})|)^2 (\cos\Theta)^2 \left(\frac{\lambda}{3\pi h}\right)^2 d\Theta$$

$$C_2 = \int_{\Theta=\Theta_{undersired\ low}}^{\Theta_{undesired\ high}} (|AF(\Theta, \psi_0, \ldots, \psi_{N-1})|)^2 (\cos\Theta)^2 \left(\frac{\lambda}{3\pi h}\right)^2 d\Theta$$

$$C_3 = std\left(|\overline{AF}(\Theta, \psi_0, \ldots, \psi_{N-1})|)^2 (\cos\Theta)^2 \left(\frac{\lambda}{3\pi h}\right)^2\right),$$

$$\forall \Theta \in [\Theta_{low}, \Theta_{high}]$$

Herein, a higher value of $C_1$ corresponds to more energy radiation for a desired area, a higher value of $C_2$ corresponds to more energy radiation in undesired area, and a lower value of $C_3$ corresponds to better fairness. As an example, one of possible empirical target functions can be expressed as below.

$$\text{Maximize } \{f_{empirical}(\Theta, \psi_0, \ldots, \psi_{N-1})\} = \text{Maximize } \left\{\frac{C_1}{C_2 C_3}\right\}$$

Notably, it is possible to adjust and control the empirical target function by introducing weighting of components. An example of weighting by exponential control is shown below.

$$\text{Maximize } \{f_{empirical}(\Theta, \psi_0, \ldots, \psi_{N-1})\} = \text{Maximize } \left\{\frac{(C_1)^{p_1}}{(C_2)^{p_2}(C_3)^{p_3}}\right\}$$

The following is another example of weighting by ratio with bias.

$$\text{Maximize } \{f_{empirical}(\Theta, \psi_0, \ldots, \psi_{N-1})\} =$$

$$\text{Maximize } \left\{\frac{\left(\frac{C_1 + b_1}{C_1 - b_1}\right)}{\left(\frac{C_2 + b_2}{C_2 - b_2}\right)\left(\frac{C_3 + b_3}{C_3 - b_3}\right)}\right\}$$

For higher $p_i$ and $b_i$ values, the i-th component will have more impact on the target function for maximization search. Utilizing an empirical method requires multiple try and test manual tuning to choose the weights but can be useful when a possible limit(s) for a constrained method is unknown or hard to define. The single function and function with constraints methods can be used in a common search procedure, where we first determine feasible limits for constraints by search with single function and apply them for solution of function maximization with constraints.

As mentioned above, in a general case we have M×N free parameters when the beam synthesis is an NP hard problem. However, the rectangular coverage approach reduces it to two NP hard problems with M or N. Applying the symmetry approach described herein, it is possible to reduce both orientations calculation complexity for a central beam by 2, having two separate M/2 and N/2 problems, and for the side beams we reduce by symmetry only one of the orientations.

All this makes feasible a direct numerical search where all options can be tested. For example, in the case of an 8×8 array with 5 bits quantization for phase control, there will be $(2^5)^{64}=2.1\times10^{96}$ options, and when one of the antenna elements is defined as an anchor with phase zero, it is still a high number of options $(2^5)^{63}=6.7\times10^{94}$.

Separating 8×8 to two 8×1 arrays, that is suitable for pinpoint beam, but also for rectangular beam synthesis as showed above, we have $(2^5)^8=1.1\times10^{12}$, taking in account that we need to control only relative phases, we can reduce it to $(2^5)^7=3.4\times10^{10}$.

For N×1 (M×1) ULA arrays with orientation where we can apply symmetry, first and second half of control phases vector are mirrored, recalling that we control relative phases, we end with 3 free parameters for symmetric 8×1 array, having $(2^5)^3=32,768$ options. Both cases: non-symmetric 8×1 with $3.4\times10^{10}$ and 32,768 options for symmetric case, are feasible for direct numerical search to run on today's computers.

Figure 9:
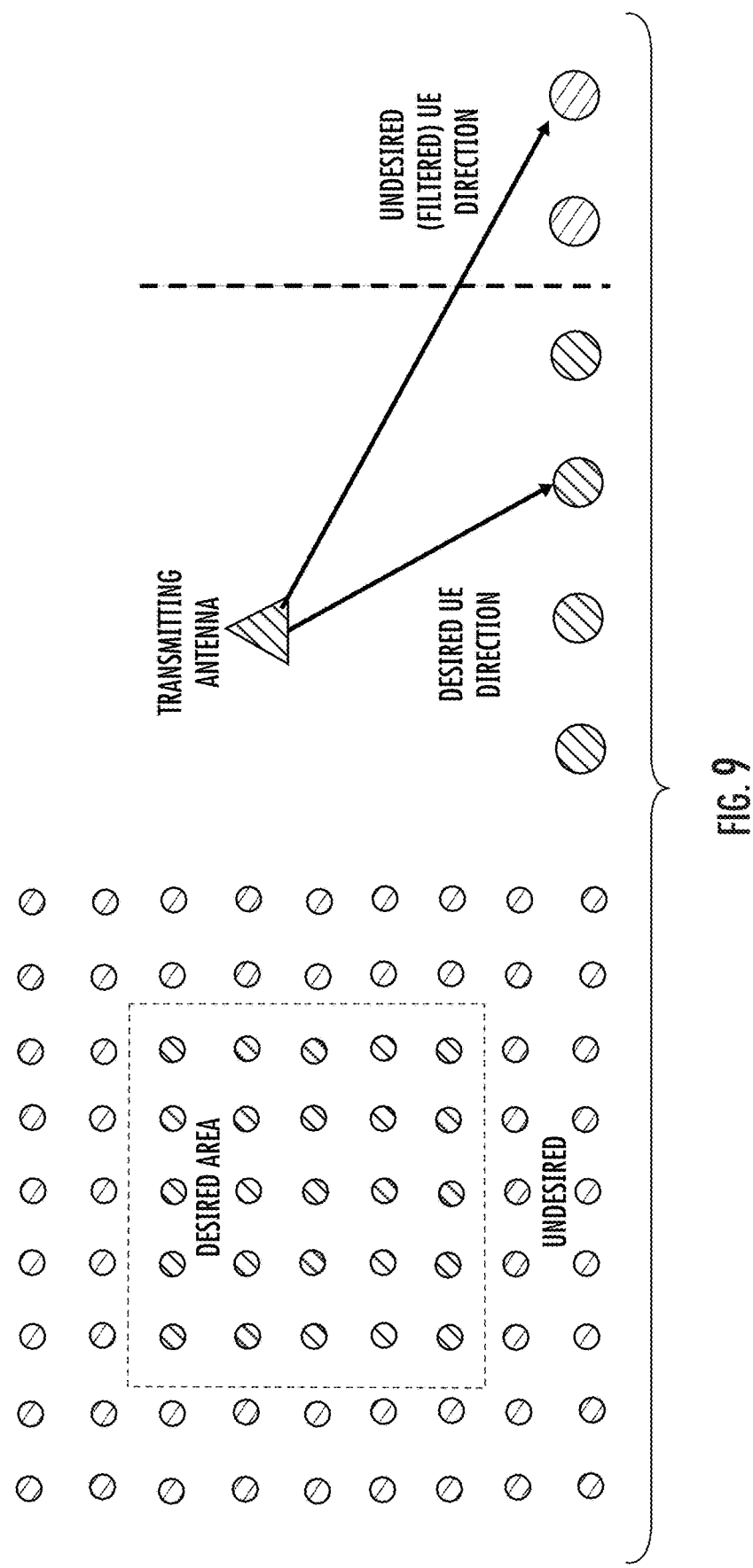
FIG. 9 is a schematic diagram illustrating the Wiener-Hopf theorem-based approach for generating a rectangular-area coverage beam.

In an embodiment, a Wiener-Hopf theorem-based approach may also be employed to generate a rectangular-area coverage beam. FIG. 9 is a schematic diagram illustrating the Wiener-Hopf theorem-based approach. The Wiener-Hopf theorem-based approach may include the following steps.

1. Define a x-y sample-points grid over a rectangular area which needs to be supplied with uniform coverage (desired directions).
2. To extend for interference mitigation, add an outer point-samples area, which corresponds to undesired directions.
3. For each point calculate azimuth $\phi$ and elevation $\Theta$ angles. Elevation angle will also depend on transmitting antenna array height and receiver antenna height.
4. Compute path losses $L_i$ between array and each point, using a free space path loss formula as an example.
5. Apply Wiener-Hopf theorem of finding optimal weights $W_{opt}$ to cover uniformly each calculated desired direction and uniformly reduce all undesired directions. The required-power weights are set according to path losses:

$$W_{opt} = R_{xx}^{-1} R_{xd}$$

$$R_{xd} = \sum_{desired\ x,y\ points} L_i b_i$$

$$R_{xx} = \sum_{all\ x,y\ points} L_i b_i b_i^H$$

Herein, 'H' denotes conjugate transpose and $b_i$ is a vector of values each corresponding to antenna array element:

$$b_i^{m,n} = e^{-jk(md_x \sin\Theta\cos\phi + nd_y \sin\Theta\sin\phi)}$$

Figure 10C:
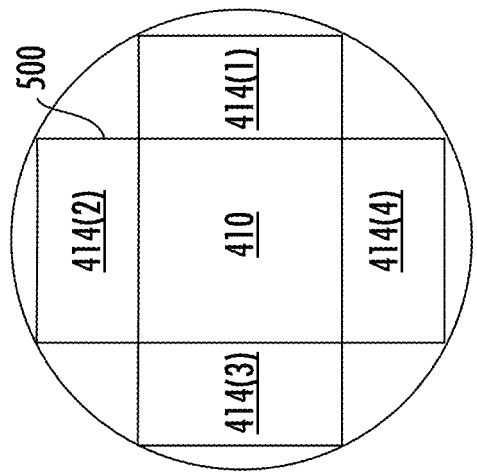
FIGS. 10A-10C are schematic diagrams providing exemplary illustrations of various beam coverage scenarios.
Figure 10B:
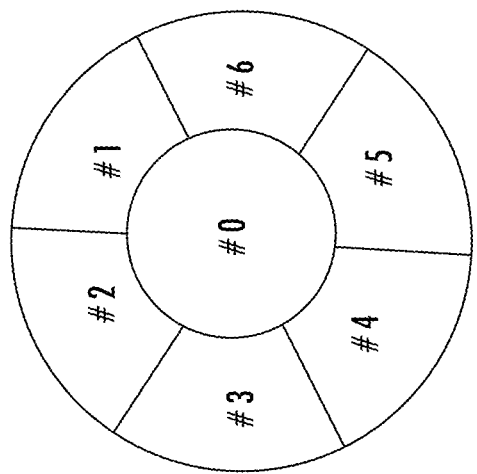
Figure 10A:
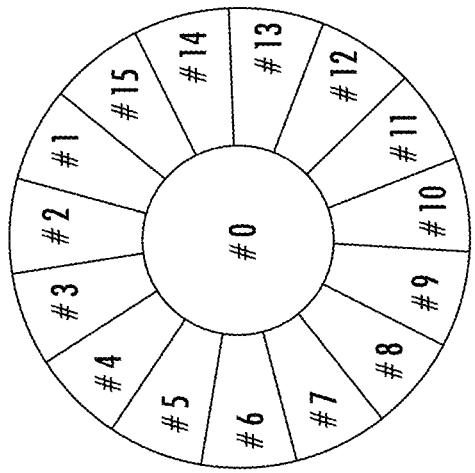

FIGS. 10A-10C are schematic diagrams providing exemplary illustrations of various beam coverage scenarios. Specifically, FIG. 10A is an example of standard multi-beam coverage with radial pinpoint steered beams, FIG. 10B is an example of shaped radial beams, and FIG. 10C is an example of the two-tier coverage area 500 of FIG. 5A.

As can be observed from FIG. 10C, the two-tier coverage area 500 does not cover a whole interior of a circle. Instead, by applying a tiling technique, it is possible to provide fair non-interrupted coverage in the multi-cell coverage area 403 of FIG. 5B. Given that the main RF beam 408 needs to cover the main coverage area 410 that is twice the size of each of the side coverage areas 414(1)-414(4), the main RF beam 408 may be radiated twice in each initial access beam interval if UEs in the two-tier coverage area 500 are equally distributed.

Figure 11:
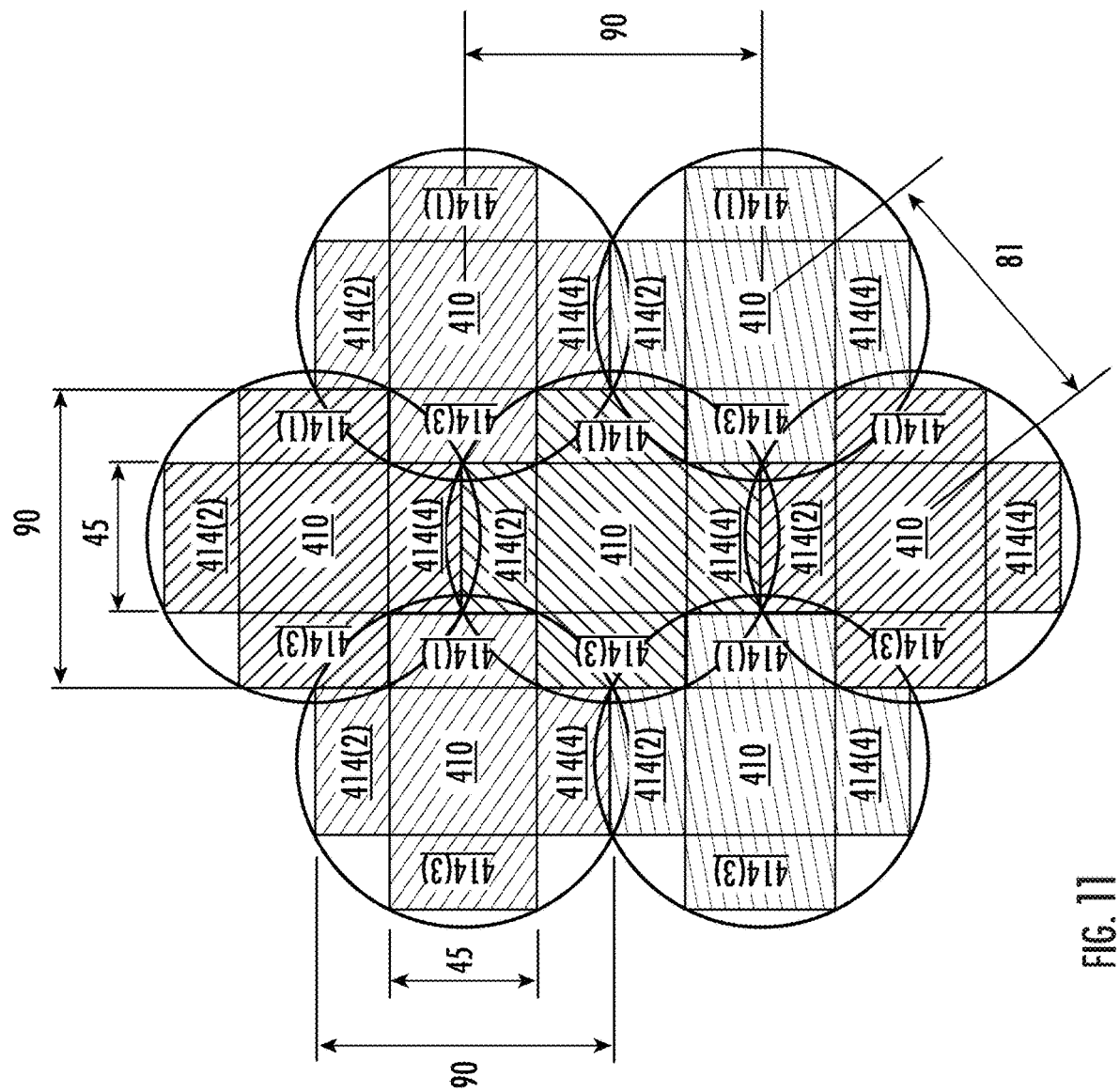
FIG. 11 is a schematic diagram providing an exemplary illustration as to how the coverage area in FIG. 5A can be equivalent to a hexagonal or circular placement.
Figure 11:
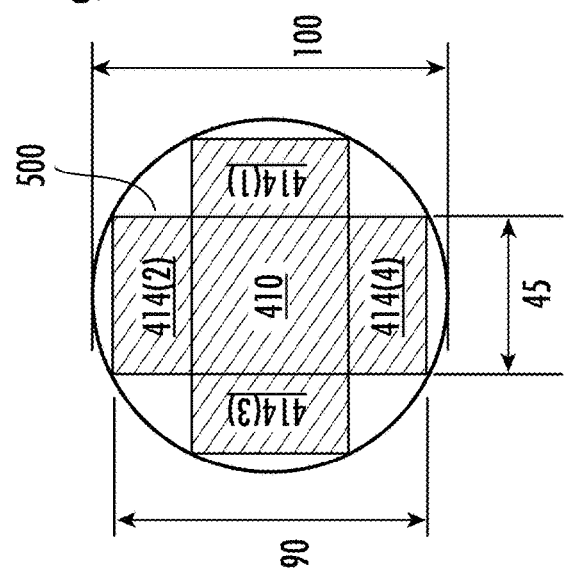

FIG. 11 is a schematic diagram providing an exemplary illustration as to how the two-tier coverage area 500 in FIG. 5A can be equivalent to a hexagonal or circular placement.

Figure 12C:
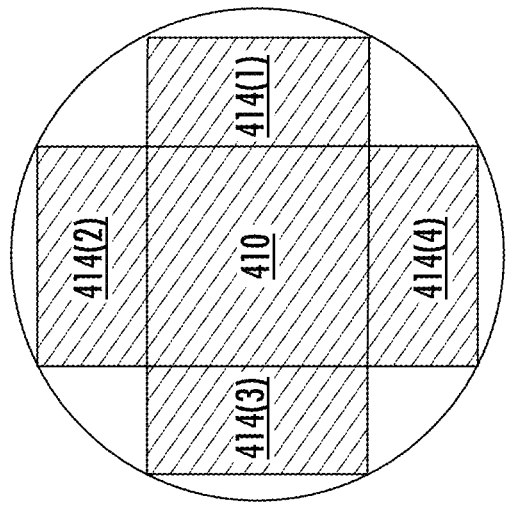
FIGS. 12A-12C are schematic diagrams providing exemplary illustrations as to how a hybridization of radial and rectangular beams can be utilized to improve inter-cell mobility.
Figure 12B:
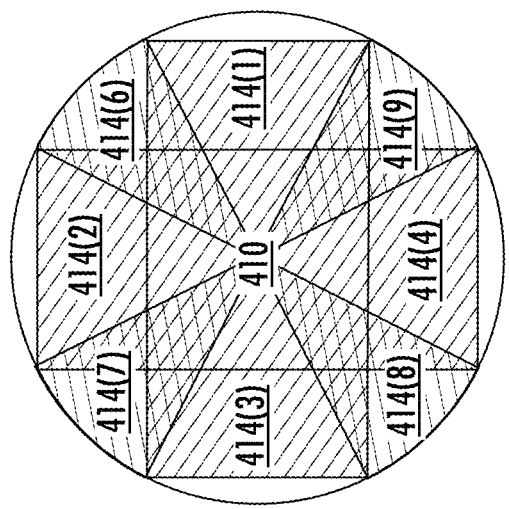
Figure 12A:
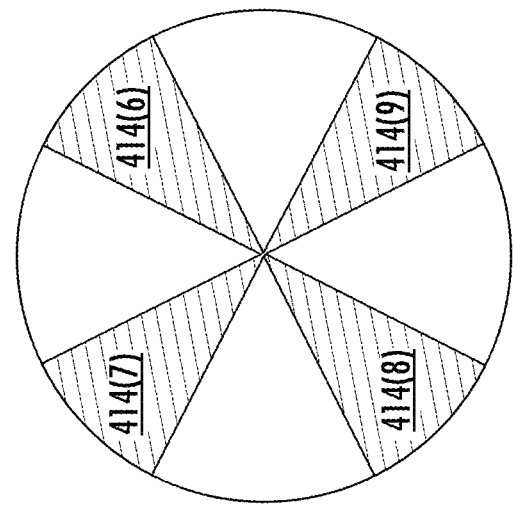

FIGS. 12A-12C are schematic diagrams providing exemplary illustrations as to how a hybridization of radial and rectangular beams can be utilized to improve inter-cell mobility.

Figure 13:
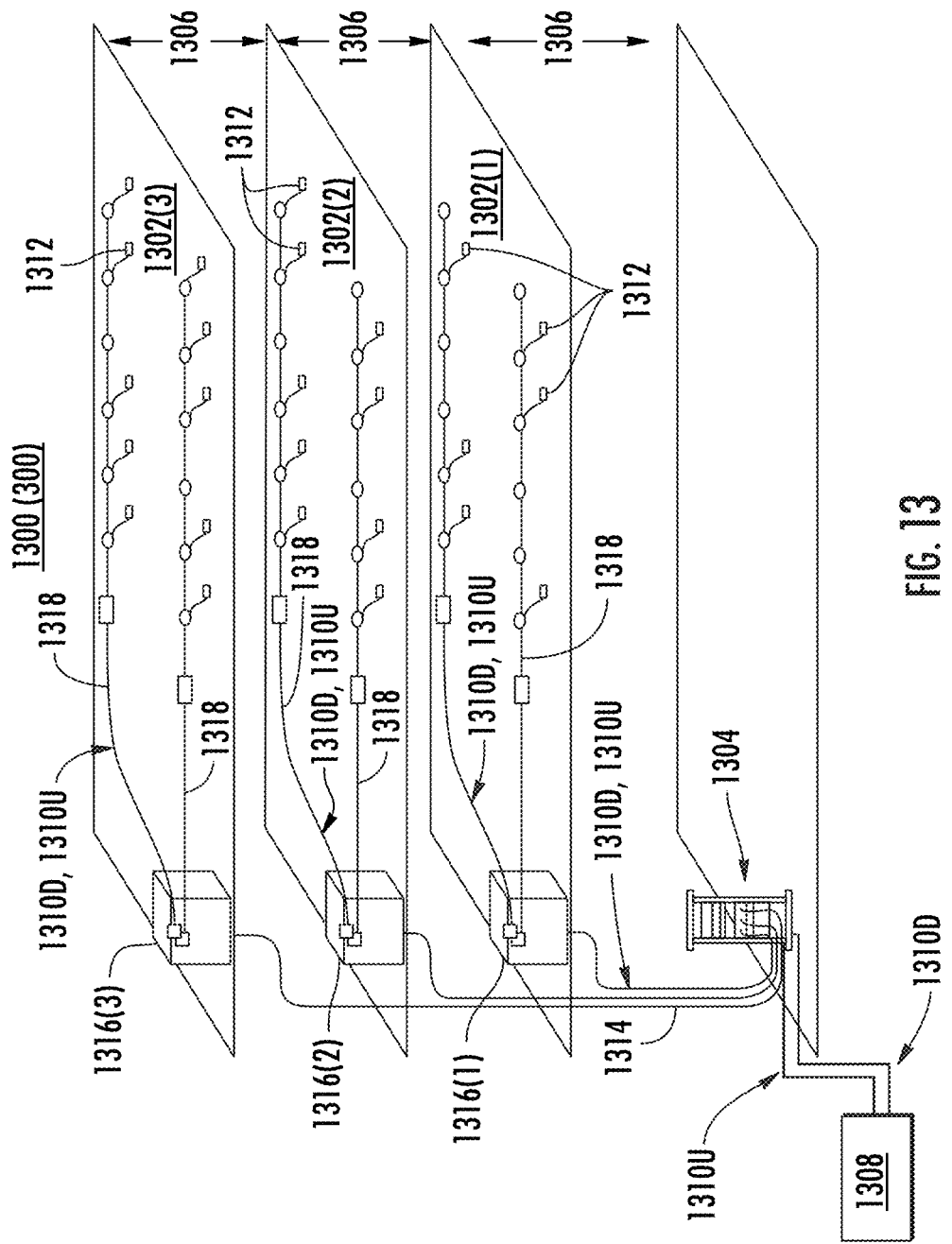
FIG. 13 is a partial schematic cut-away diagram of an exemplary building infrastructure in a WCS, such as the WCS of FIG. 3 that includes the network device of FIG. 4 for providing multi-beam uniform coverage in the coverage cells.

The WCS 300 of FIG. 3, which can include the wireless device 400 in FIG. 4, can be provided in an indoor environment as illustrated in FIG. 13. FIG. 13 is a partial schematic cut-away diagram of an exemplary building infrastructure 1300 in a WCS, such as the WCS 300 of FIG. 3 that includes the wireless device 400 of FIG. 4. The building infrastructure 1300 in this embodiment includes a first (ground) floor 1302(1), a second floor 1302(2), and a third floor 1302(3). The floors 1302(1)-1302(3) are serviced by a central unit 1304 to provide antenna coverage areas 1306 in the building infrastructure 1300. The central unit 1304 is communicatively coupled to a base station 1308 to receive downlink communications signals 1310D from the base station 1308. The central unit 1304 is communicatively coupled to a plurality of remote units 1312 to distribute the downlink communications signals 1310D to the remote units 1312 and to receive uplink communications signals 1310U from the remote units 1312, as previously discussed above. The downlink communications signals 1310D and the uplink communications signals 1310U communicated between the central unit 1304 and the remote units 1312 are carried over a riser cable 1314. The riser cable 1314 may be routed through interconnect units (ICUs) 1316(1)-1316(3) dedicated to each of the floors 1302(1)-1302(3) that route the downlink communications signals 1310D and the uplink communications signals 1310U to the remote units 1312 and also provide power to the remote units 1312 via array cables 1318.

Figure 14:
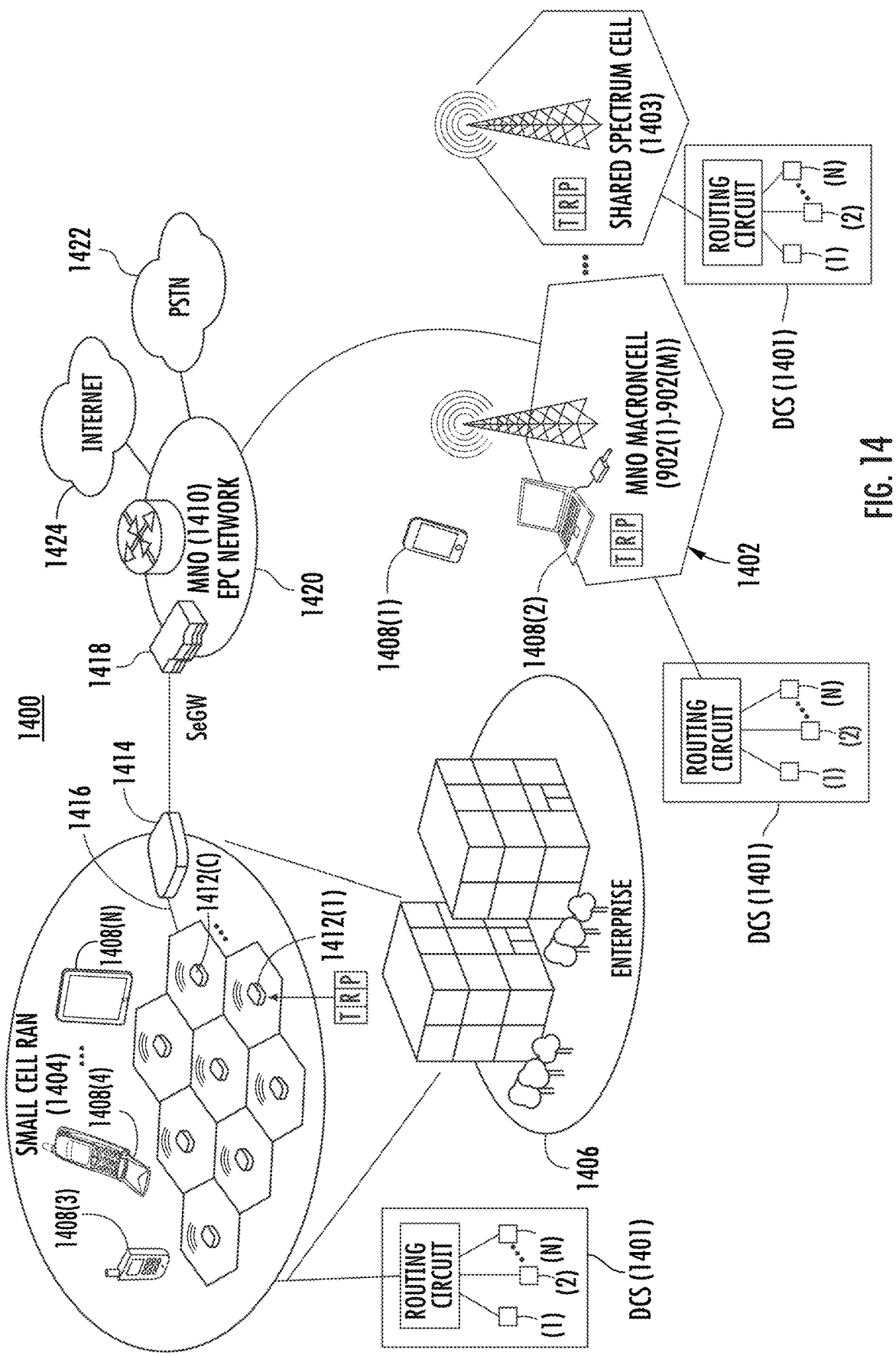
FIG. 14 is a schematic diagram of an exemplary mobile telecommunications environment that can includes the WCS of FIG. 3 that includes the network device of FIG. 4 for providing multi-beam uniform coverage in the coverage cells.

The WCS 300 of FIG. 3 and the wireless device 400 of FIG. 4, configured to provide multi-beam uniform coverage in one or more coverage cells, can also be interfaced with different types of radio nodes of service providers and/or supporting service providers, including macrocell systems, small cell systems, and remote radio heads (RRH) systems, as examples. For example, FIG. 14 is a schematic diagram of an exemplary mobile telecommunications environment 1400 (also referred to as "environment 1400") that includes radio nodes and cells that may support shared spectrum, such as unlicensed spectrum, and can be interfaced to shared spectrum WCSs 1401 supporting coordination of distribution of shared spectrum from multiple service providers to remote units to be distributed to subscriber devices. The shared spectrum WCSs 1401 can include the WCS 300 of FIG. 3 that includes the wireless device 400 of FIG. 4, as an example.

The environment 1400 includes exemplary macrocell RANs 1402(1)-1402(M) ("macrocells 1402(1)-1402(M)") and an exemplary small cell RAN 1404 located within an enterprise environment 1406 and configured to service mobile communications between a user mobile communications device 1408(1)-1408(N) to a mobile network operator (MNO) 1410. A serving RAN for the user mobile communications devices 1408(1)-1408(N) is a RAN or cell in the RAN in which the user mobile communications devices 1408(1)-1408(N) have an established communications session with the exchange of mobile communications signals for mobile communications. Thus, a serving RAN may also be referred to herein as a serving cell. For example, the user mobile communications devices 1408(3)-1408(N) in FIG. 14 are being serviced by the small cell RAN 1404, whereas the user mobile communications devices 1408(1) and 1408(2) are being serviced by the macrocell 1402. The macrocell 1402 is an MNO macrocell in this example. However, a shared spectrum RAN 1403 (also referred to as "shared spectrum cell 1403") includes a macrocell in this example and supports communications on frequencies that are not solely licensed to a particular MNO, such as CBRS for example, and thus may service user mobile communications devices 1408(1)-1408(N) independent of a particular MNO. For example, the shared spectrum cell 1403 may be operated by a third party that is not an MNO and wherein the shared spectrum cell 1403 supports CBRS. Also, as shown in FIG. 14, the MNO macrocell 1402, the shared spectrum cell 1403, and/or the small cell RAN 1404 can interface with a shared spectrum WCS 1401 supporting coordination of distribution of shared spectrum from multiple service providers to remote units to be distributed to subscriber devices. The MNO macrocell 1402, the shared spectrum cell 1403, and the small cell RAN 1404 may be neighboring radio access systems to each other, meaning that some or all can be in proximity to each other such that a user mobile communications device 1408(3)-1408(N) may be able to be in communications range of two or more of the MNO macrocell 1402, the shared spectrum cell 1403, and the small cell RAN 1404 depending on the location of the user mobile communications devices 1408(3)-1408(N).

In FIG. 14, the mobile telecommunications environment 1400 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1400 includes the enterprise environment 1406 in which the small cell RAN 1404 is implemented. The small cell RAN 1404 includes a plurality of small cell radio nodes 1412(1)-1412(C). Each small cell radio node 1412(1)-1412(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 14, the small cell RAN 1404 includes one or more services nodes (represented as a single services node 1414) that manage and control the small cell radio nodes 1412(1)-1412(C). In alternative implementations, the management and control functionality may be incorporated into a radio node, distributed among nodes, or implemented remotely (i.e., using infrastructure external to the small cell RAN 1404). The small cell radio nodes 1412(1)-1412(C) are coupled to the services node 1414 over a direct or local area network (LAN) connection 1416 as an example, typically using secure IPsec tunnels. The small cell radio nodes 1412(1)-1412(C) can include multi-operator radio nodes. The services node 1414 aggregates voice and data traffic from the small cell radio nodes 1412(1)-1412(C) and provides connectivity over an IPsec tunnel to a security gateway (SeGW) 1418 in a network 1420 (e.g., evolved packet core (EPC) network in a 4G network, or 5G Core in a 5G network) of the MNO 1410. The network 1420 is typically configured to communicate with a public switched telephone network (PSTN) 1422 to carry circuit-switched traffic, as well as for communicating with an external packet-switched network such as the Internet 1424.

The environment 1400 also generally includes a node (e.g., eNodeB or gNodeB) base station, or "macrocell" 1402. The radio coverage area of the macrocell 1402 is typically much larger than that of a small cell where the extent of coverage often depends on the base station configuration and surrounding geography. Thus, a given user mobile communications device 1408(3)-1408(N) may achieve connectivity to the network 1420 (e.g., EPC network in a 4G network, or 5G Core in a 5G network) through either a macrocell 1402 or small cell radio node 1412(1)-1412(C) in the small cell RAN 1404 in the environment 1400.

Figure 15:
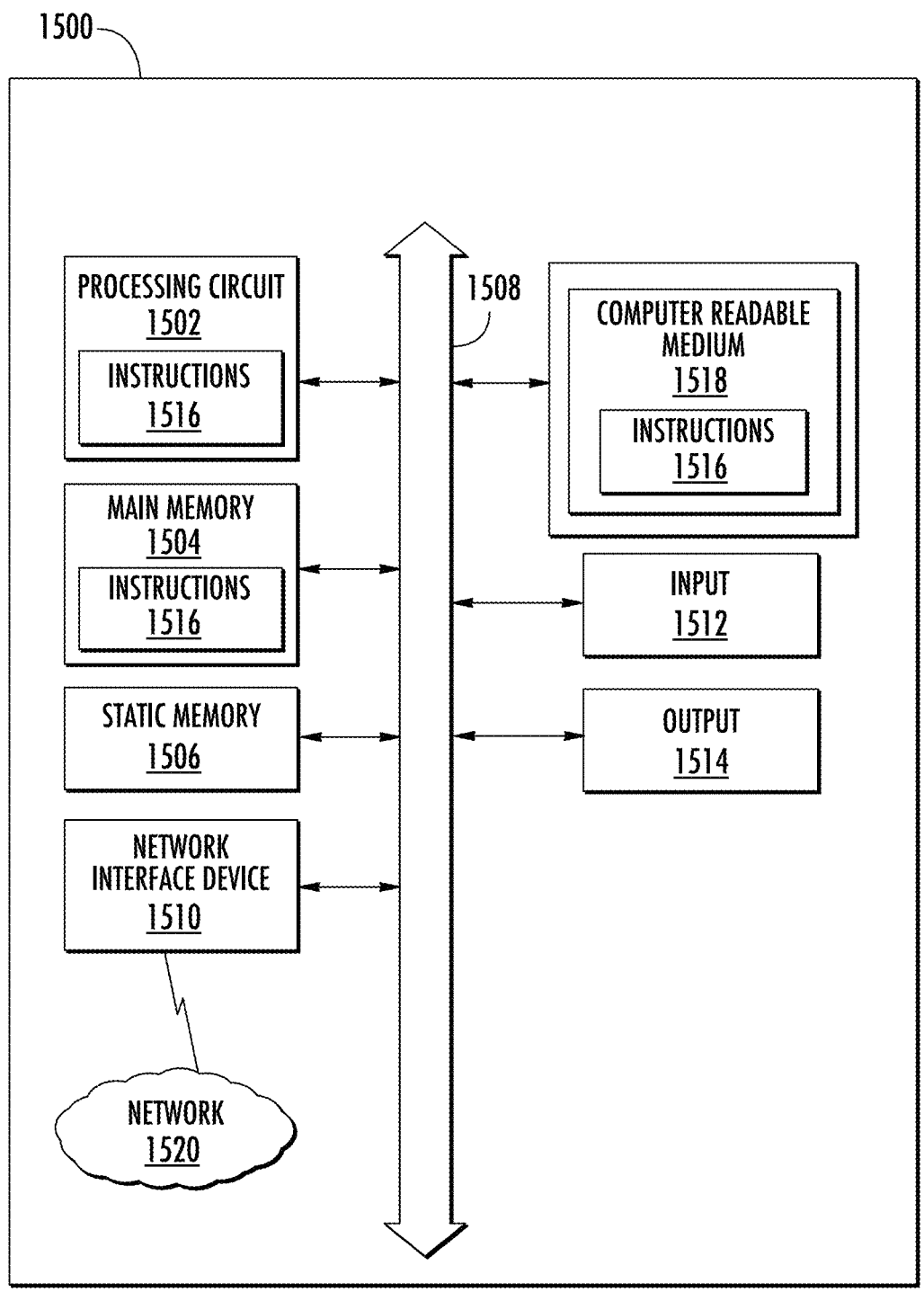
FIG. 15 is a schematic diagram of a representation of an exemplary computer system that can be included in or interfaced with any of the components in the WCS of FIG. 3 and the network device in FIG. 4 for providing multi-beam uniform coverage in the coverage cells, wherein the exemplary computer system is configured to execute instructions from an exemplary computer-readable medium.

Any of the circuits in the WCS 300 of FIG. 3 and the wireless device 400 of FIG. 4, such as the control circuit 422, can include a computer system 1500, such as that shown in FIG. 15, to carry out their functions and operations. With reference to FIG. 15, the computer system 1500 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1500 in this embodiment includes a processing circuit or processor 1502, a main memory 1504 (e.g., read-only memory (ROM), flash memory, dynamic random access memory (DRAM) such as synchronous DRAM (SDRAM), etc.), and a static memory 1506 (e.g., flash memory, static random access memory (SRAM), etc.), which may communicate with each other via a data bus 1508. Alternatively, the processing circuit 1502 may be connected to the main memory 1504 and/or static memory 1506 directly or via some other connectivity means. The processing circuit 1502 may be a controller, and the main memory 1504 or static memory 1506 may be any type of memory.

The processing circuit 1502 represents one or more general-purpose processing circuits such as a microprocessor, central processing unit, or the like. More particularly, the processing circuit 1502 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1502 is configured to execute processing logic in instructions 1516 for performing the operations and steps discussed herein.

The computer system 1500 may further include a network interface device 1510. The computer system 1500 also may or may not include an input 1512 to receive input and selections to be communicated to the computer system 1500 when executing instructions. The computer system 1500 also may or may not include an output 1514, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1500 may or may not include a data storage device that includes instructions 1516 stored in a computer-readable medium 1518. The instructions 1516 may also reside, completely or at least partially, within the main memory 1504 and/or within the processing circuit 1502 during execution thereof by the computer system 1500, the main memory 1504 and the processing circuit 1502 also constituting the computer-readable medium 1518. The instructions 1516 may further be transmitted or received over a network 1520 via the network interface device 1510.

While the computer-readable medium 1518 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer—readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A wireless device, comprising:
   two or more antenna arrays, each configured to form a main radio frequency (RF) beam to provide a uniform coverage in a main coverage area of a first geometric shape in a respective one of two or more coverage cells; and
   a control circuit configured to:
      select two or more main beam codewords predetermined for forming the main RF beam in the two or more coverage cells, respectively; and
      cause the two or more antenna arrays to each form the main RF beam to provide the uniform coverage in the respective one of the two or more coverage cells based on a respective one of the two or more selected main beam codewords.

2. The wireless device of claim 1, wherein:
   the two or more antenna arrays are each further configured to form a plurality of side RF beams to cover a plurality of side coverage areas of at least one second geometric shape in the respective one of the two or more coverage cells; and
   the control circuit is further configured to:
      select a plurality of side beam codewords predetermined for forming the plurality of side RF beams in each of the two or more coverage cells; and
      cause each of the two or more antenna arrays to form the plurality of side RF beams in the respective one of the two or more coverage cells based on the plurality of selected side beam codewords.

3. The wireless device of claim 2, wherein the two or more antenna arrays are each further configured to:
   form the main RF beam to cover a rectangular-shaped main coverage area; and
   form the plurality of side RF beams to each cover a respective one of a plurality of rectangular-shaped side coverage areas that is smaller than the rectangular-shaped main coverage area.

4. The wireless device of claim 3, wherein each of the plurality of rectangular-shaped side coverage areas is one-half of the rectangular-shaped main coverage area.

5. The wireless device of claim 3, wherein the plurality of rectangular-shaped side coverage areas comprises four rectangular-shaped side coverage areas each formed adjacent to a respective one of four sides of the rectangular-shaped main coverage area but non-overlapping with the rectangular-shaped main coverage area.

6. The wireless device of claim 3, wherein the two or more coverage cells formed by the two or more antenna arrays are non-overlapping coverage areas.

7. The wireless device of claim 2, wherein the two or more antenna arrays are each further configured to:
   form the main RF beam to cover a rectangular-shaped main coverage area; and
   form the plurality of side RF beams to cover a plurality of rectangular-shaped first side coverage areas and a plurality of trapezoidal-shaped second side coverage areas.

8. The wireless device of claim 7, wherein each of the plurality of rectangular-shaped first side coverage areas is one-half of the rectangular-shaped main coverage area.

9. The wireless device of claim 7, wherein:
   the plurality of rectangular-shaped first side coverage areas comprises four rectangular-shaped first side coverage areas each formed adjacent to a respective one of four sides of the rectangular-shaped main coverage area but non-overlapping with the rectangular-shaped main coverage area; and
   the plurality of trapezoidal-shaped second side coverage areas comprises four trapezoidal-shaped second side coverage areas each formed adjacent to but non-overlapping with a respective one of the four rectangular-shaped first side coverage areas.

10. The wireless device of claim 7, wherein the respective one of the two or more coverage cells formed by the two or more antenna arrays are overlapping coverage cells.

11. The wireless device of claim 1, wherein the two or more antenna arrays each comprises a plurality of antenna elements provided in an equally spaced grid having a first number of rows and a second number of columns.

12. A method for providing multi-beam uniform coverage, comprising:
- Selecting two or more main beam codewords, each predetermined for forming a main radio frequency (RF) beam to provide a uniform coverage in a main coverage area of a first geometric shape in a respective one of two or more coverage cells; and
- forming the main RF beam in each of the two or more coverage cells based on a respective one of the two or more selected main beam codewords.

13. The method of claim 12, further comprising:
- selecting a plurality of side beam codewords predetermined for forming a plurality of side RF beams to cover a plurality of side coverage areas of at least one second geometric shape in each of the two or more coverage cells; and
- forming the plurality of side RF beams in each of the two or more coverage cells based on the plurality of selected side beam codewords.

14. The method of claim 13, further comprising:
- forming the main RF beam to cover a rectangular-shaped main coverage area; and
- forming the plurality of side RF beams to each cover a respective one of a plurality of rectangular-shaped side coverage areas that is smaller than the rectangular-shaped main coverage area.

15. The method of claim 14, further comprising forming each of the plurality of rectangular-shaped side coverage areas that is one-half of the rectangular-shaped main coverage area.

16. The method of claim 14, further comprising forming the plurality of rectangular-shaped side coverage areas to comprise four rectangular-shaped side coverage areas each formed adjacent to a respective one of four sides of the rectangular-shaped main coverage area but non-overlapping with the rectangular-shaped main coverage area.

17. The method of claim 13, further comprising forming the two or more coverage cells as non-overlapping coverage areas.

18. The method of claim 13, further comprising:
- forming the main RF beam to cover a rectangular-shaped main coverage area; and
- forming the plurality of side RF beams to cover a plurality of rectangular-shaped first side coverage areas and a plurality of trapezoidal-shaped second side coverage areas.

19. The method of claim 18, further comprising forming each of the plurality of rectangular-shaped first side coverage areas that is one-half of the rectangular-shaped main coverage area.

20. The method of claim 18, further comprising:
- forming the plurality of rectangular-shaped first side coverage areas to comprise four rectangular-shaped first side coverage areas each formed adjacent to a respective one of four sides of the rectangular-shaped main coverage area but non-overlapping with the rectangular-shaped main coverage area; and
- forming the plurality of trapezoidal-shaped second side coverage areas to comprise four trapezoidal-shaped second side coverage areas each formed adjacent to but non-overlapping with a respective one of the four rectangular-shaped first side coverage areas.

21. The method of claim 18, further comprising forming the two or more coverage cells as overlapping coverage cells.

22. A wireless communications system (WCS), comprising:
- at least one wireless device, comprising:
  - two or more antenna arrays each configured to form a main radio frequency (RF) beam to provide a uniform coverage in a main coverage area of a first geometric shape in a respective one of two or more coverage cells; and
  - a control circuit configured to:
    - select two or more main beam codewords predetermined for forming the main RF beam in the respective one of the two or more coverage cells, respectively; and
    - cause the two or more antenna arrays to each form the main RF beam to provide the uniform coverage in the respective one of the two or more coverage cells based on a respective one of the two or more selected main beam codewords.

23. The WCS of claim 22, wherein:
- the two or more antenna arrays are each further configured to form a plurality of side RF beams to cover a plurality of side coverage areas of at least one second geometric shape in the respective one of the two or more coverage cells; and
- the control circuit is further configured to:
  - select a plurality of side beam codewords predetermined for forming the plurality of side RF beams in each of the two or more coverage cells; and
  - cause each of the two or more antenna arrays to form the plurality of side RF beams in the respective one of the two or more coverage cells based on the plurality of selected side beam codewords.

24. The WCS of claim 22, further comprising a distributed communications system (DCS), the DCS comprising:
- a digital routing unit (DRU) coupled to a centralized services node via a baseband unit (BBU); and
- a plurality of remote units each coupled to the DRU via a plurality of optical fiber-based communications mediums, respectively;
- wherein the DRU comprises:
  - an electrical-to-optical (E/O) converter configured to:
    - convert a plurality of downlink communications signals into a plurality of downlink optical communications signals, respectively; and
    - provide the plurality of downlink optical communications signals to the plurality of remote units, respectively; and
  - an optical-to-electrical (O/E) converter configured to:
    - receive a plurality of uplink optical communications signals from the plurality of remote units, respectively; and
    - convert the plurality of uplink optical communications signals into a plurality of uplink communications signals, respectively;
- wherein the plurality of remote units each comprises:
  - a respective O/E converter configured to convert a respective one of the plurality of downlink optical communications signals into a respective one of the plurality of downlink communications signals; and
  - a respective E/O converter configured to convert a respective one of the plurality of uplink communications signals into a respective one of the plurality of uplink optical communications signals.

* * * * *